United States Patent
Nomura et al.

(10) Patent No.: US 6,887,966 B2
(45) Date of Patent: May 3, 2005

(54) GAS-BARRIER POLYURETHANE RESIN, AND ADHESIVE FOR LAMINATE, GAS-BARRIER FILM AND PAINT CONTAINING THE SAME

(75) Inventors: Takeshi Nomura, Kanagawa (JP); Takeshi Koyama, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 8 days.

(21) Appl. No.: 10/453,609

(22) Filed: Jun. 4, 2003

(65) Prior Publication Data

US 2003/0229194 A1 Dec. 11, 2003

(30) Foreign Application Priority Data

Jun. 4, 2002 (JP) ......................................... 2002-162743
Jun. 4, 2002 (JP) ......................................... 2002-162744

(51) Int. Cl.$^7$ ............................................. C08G 18/50
(52) U.S. Cl. ............................. 528/78; 528/60; 528/64; 528/79
(58) Field of Search ............................. 528/60, 64, 78, 528/79

(56) References Cited

U.S. PATENT DOCUMENTS 4,408,034 A * 10/1983 Kazama et al. ............... 528/54
6,569,533 B1 * 5/2003 Uchida et al. ........... 428/423.1

FOREIGN PATENT DOCUMENTS

| | | |
|---|---|---|
| EP | 1 081 170 A2 | 3/2001 |
| EP | 1 234 842 A1 | 8/2002 |
| JP | 2-71876 A | 3/1990 |
| JP | 10-67964 A | 3/1998 |
| JP | 11-269422 A | 10/1999 |

* cited by examiner

*Primary Examiner*—Rachel Gorr
(74) *Attorney, Agent, or Firm*—Antonelli, Terry, Stout & Kraus, LLP

(57) ABSTRACT

The polyurethane resin produced by reacting a component composed mainly of an active hydrogen-containing compound with a component composed mainly of an organic polyisocyanate compound which contains a backbone structure represented by the formula:

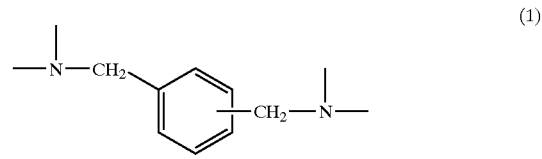

(1)

in an amount of 25% by weight or higher, exhibits a high gas-barrier property and a high adhesion property. Accordingly, the present invention provides: (A) a two-part liquid curable polyurethane resin composition having an excellent adhesion property; (B) a heat-curing gas-barrier polyurethane resin useful as a packaging material; and (C) a paint having excellent rust-proofing property, corrosion resistance and aesthetic decorating property.

22 Claims, No Drawings

US 6,887,966 B2

GAS-BARRIER POLYURETHANE RESIN, AND ADHESIVE FOR LAMINATE, GAS-BARRIER FILM AND PAINT CONTAINING THE SAME

BACKGROUND OF THE INVENTION

1. Field of the Invention

The present invention relates to a gas-barrier polyurethane resin, and an adhesive for laminate, a gas-barrier film and a paint that contain such a resin. More specifically, the invention relates to (A) a two-part liquid curable polyurethane resin composition capable of exhibiting not only a high gas-barrier property but also a high adhesion property, especially an excellent adhesion property to various polymers, papers, metals, etc., after boiling and retort treatments, as well as an adhesive for gas-barrier laminate containing such a composition; (B) a heat-curing gas-barrier polyurethane resin that is useful as a packaging material for foodstuffs or drugs for the purpose of preserving contents thereof by preventing various gases such as oxygen, water vapor and gaseous aroma components from penetrating therethrough, and not only maintains a high gas-barrier property especially even after boiling and retort treatments under a high humidity condition, but also exhibits an excellent adhesion property to a base film, as well as a gas-barrier film containing such a resin; and (C) a paint that can be extensively used in various applications such as coating materials for rust-proofing, corrosion-resisting and aesthetic decorating purposes, and packaging materials for foodstuffs or drugs which are required to show a high gas-barrier property.

2. Description of the Prior Art

In recent years, packaging materials have been predominantly prepared from composite flexible films using different kinds of polymer materials in combination because of their good strength, goods-keeping ability, working suitability, printability for advertising effects, etc. The composite flexible films generally include an outer layer made of a thermoplastic resin film, etc., serving for protecting goods, and a sealant layer made of a thermoplastic resin film, etc. These layers are laminated by a dry-lamination method in which the sealant layer is bonded to the laminated film layer via an adhesive applied to the film layer, or by an extrusion lamination method in which the sealant layer made of molten plastic film is press-bonded to the laminated film layer on which an anchor coat agent may be applied, if required. As the adhesive used in these methods, there have been predominantly adopted two-part liquid polyurethane-based adhesives usually composed of a main ingredient containing an active hydrogen-containing group such as hydroxyl group, and an isocyanate group-containing curing agent, in view of a high adhesion property thereof.

However, the conventional polyurethane-based adhesives in themselves exhibit no gas-barrier property. Therefore, when these adhesives are applied to packaging materials requiring a gas-barrier property, it is necessary to separately laminate various gas-barrier layers such as a polyvinylidene chloride (PVDC) coating layer, a polyvinyl alcohol (PVA) coating layer, an ethylene-vinyl alcohol copolymer (EVOH) film layer, a meta-xylyleneadipamide film layer and an inorganic deposited film layer on which alumina ($Al_2O_3$), silica (Si) or the like is vapor-deposited. Of these layers, the PVDC-coated film is known as a laminated film having a high barrier property to oxygen and water vapor and, therefore, have been extensively used as various packaging materials for foodstuffs. However, recently, there occurs such a problem that the PVDC-containing packaging materials generate dioxins upon disposal thereof. Therefore, it has been strongly required to replace the PVDC materials with other materials.

Further, there is a recent tendency that plastic films or containers are predominantly used as packaging materials for preserving contents, because of good transparency, light weight, inexpensiveness, etc. The plastic films used for packaging foodstuffs, drugs, cosmetics, etc., are required to have a gas-barrier property to various gases, transparency, resistance to retort treatment, impact resistance, flexibility, heat sealability and the like. In particular, in order to keep properties and quality of contents to be packaged, the films are required to show a high gas-barrier property to oxygen and water vapor even under a high humidity condition or after retort treatment.

Such gas-barrier packaging materials are usually constituted by a laminate including a flexible polymer film base layer, a gas-barrier layer, a flexible polymer film sealant layer, etc. It is known that among these layers, the gas-barrier layer is made of a gas-barrier material such as polyvinylidene chloride (PVDC) coat or film, an ethylene-vinyl alcohol copolymer (EVOH resin) film, a meta-xylyleneadipamide film, an inorganic deposited film deposited with alumina ($Al_2O_3$), silica (Si) or the like, a polyvinyl alcohol (PVA) coat, etc. These gas-barrier materials are selectively used according to properties thereof, kinds of contents to be packaged, or applications thereof. Among them, it is known that the PVDC-coated films have a high gas-barrier property to oxygen and water vapor. Since PVDC shows substantially no water vapor absorption and a good gas-barrier property even under a high humidity condition, various base films are coated with the PVDC irrespective of their water vapor permeability, and the PVDC-coated films are employed for packaging various foodstuffs in the form of either dried or hydrated products. These packaging materials for domestic use are disposed of after use as ordinary wastes. In order to provide packaging materials that are favorable in view of both disposal costs and environmental protection, it has been strongly required to develop new resins that are excellent in both gas barrier property and adhesion property.

Under this circumstance, as alternative techniques, it is known to use a film made of a saponification product of ethylene-vinyl acetate copolymer (EVOH resin), a polyvinyl alcohol (PVA)-coated film, an inorganic deposited film obtained by depositing silica or alumina on a flexible polymer film, etc. However, the EVOH resin film and the PVA-coated film suffer from remarkable deterioration in oxygen-barrier property when exposed to water under a high-humidity condition or when being subjected to boiling or retort treatments. Also, the inorganic deposited film whose gas barrier layer is formed by depositing hard inorganic compounds thereon, tends to undergo formation of pinholes in the gas barrier layer upon flexing, resulting in remarkable deterioration in its gas-barrier property. Further, the production of such a vacuum-deposited film requires a large scale apparatus as compared to the production of ordinary coating films or laminated films, thereby leading to high production costs.

Also, the polyurethane resins exhibit many excellent properties such as good adhesion to various base materials, heat resistance, chemical resistance, electric properties, mechanical properties and anti-weathering property by themselves, as compared to other resins, and are, therefore, extensively used in various applications such as paints for rust-proofing, corrosion-resisting and aesthetic decorating purposes, adhesives for civil engineering or building construction, etc. Since the polyurethane resins usually used for paints have substantially no gas-barrier property, the polyurethane resin paint must be coated with a large thickness, laminated with other materials, or used together with fillers in order to prevent corrosive factors from penetrating therethrough.

On the other hand, as gas-barrier polyurethane resins or related techniques, Japanese Patent Application Laid-open No. 2001-98047 discloses a gas-barrier polyurethane resin and a gas-barrier film containing the resin, Japanese Patent Application Laid-open No. 7-112518 (1995) discloses a gas-barrier laminated stretched film using a polyurethane-based thermoplastic elastomer, and Japanese Patent Application Laid-open No. 10-168305 (1998) discloses a polyurethane composite material that is enhanced in gas-barrier property by adding layered clay mineral thereto.

However, these films have no adhesion properties therebetween and, therefore, are used only in the similar applications to those of the conventional gas-barrier films. Accordingly, in the packaging materials requiring a gas-barrier property, when the gas barrier film is laminated on the ordinary film, both surfaces of the gas-barrier film must be coated with an adhesive, resulting in not only disadvantages such as high production costs of the laminated film and complicated lamination process thereof, but also adverse influences on environments due to increased amount of wastes which have been noticed as recent social problems. Therefore, in order to provide packaging materials that are favorable in view of both production costs and environmental protection, it has been strongly required to develop resins that are excellent in both gas-barrier property and adhesion property.

In addition, the polyurethane resins disclosed in Japanese Patent Application Laid-open Nos. 7-112518 (1995) and 10-168305 (1998) are still insufficient in gas-barrier property when applied to packaging films, and are deteriorated in gas-barrier property especially when used under a high humidity condition. Therefore, it is desirable to further improve the gas-barrier property of these resins. Whereas, Japanese Patent Application Laid-open No. 2001-98047 discloses the gas-barrier polyurethane resin capable of showing an improved gas-barrier property even under a high humidity condition, as well as a gas-barrier film containing such a resin. However, the polyurethane resin is a thermoplastic resin and, therefore, fails to exhibit a sufficient gas-barrier property when exposed to a still higher humidity condition or after boiling and retort treatments under a high humidity condition. Thus, at preset, no alternative materials that are usable instead of PVDC have been obtained in view of properties and production costs thereof.

SUMMARY OF THE INVENTION

A first object of the present invention is to provide an adhesive for gas-barrier polyurethane resin laminate which exhibits not only a high gas-barrier property but also a high adhesion property, especially an excellent adhesion property to various polymers, papers, metals, etc., after boiling and retort treatments.

A second object of the present invention is to provide a gas-barrier polyurethane resin film exhibiting an extremely high gas-barrier property to oxygen, water vapor, gaseous aroma components, etc., in particular, maintaining its high gas-barrier property even after boiling and retort treatments under a high humidity condition, and further having an excellent adhesion property to a base film.

A third object of the present invention is to provide a paint not only exhibiting excellent properties inherent to polyurethane resins such as rust-proofing property, a corrosion resistance and aesthetic decoration property, but also being applicable to a packaging material for foodstuffs or drugs requiring a high gas-barrier property by preventing various gases such as oxygen, water vapor and gaseous aroma components from penetrating therethrough.

As a result of extensive studies and researches for solving the above problems, the present inventors have found that the polyurethane resin having a specific backbone structure is excellent in both gas-barrier property and adhesion property, and can provide an adhesive for laminate, a film and a paint which are also excellent in both the properties.

That is, the present invention provides a polyurethane resin produced by reacting a component comprising mainly (A) an active hydrogen-containing compound with a component comprising mainly (B) an organic polyisocyanate compound, said resin containing a backbone structure represented by the formula (1):

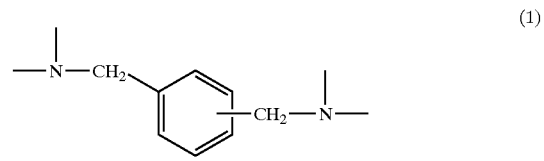

in an amount of 20% by weight or higher, as well as an adhesive for laminate and a gas-barrier film containing the resin.

More specifically, in view of the first object, the present inventors have found that the adhesive composed mainly of a two-part liquid polyurethane resin composition containing the above specific backbone structure exhibits not only a high gas-barrier property, but also a high adhesion property, especially a good adhesion property to various polymers, papers, metals, etc., after boiling and retort treatments.

Namely, in a first aspect of the present invention, there are provided a two-part liquid curable polyurethane resin composition comprising a component comprising mainly (A) an active hydrogen-containing compound and a component comprising mainly (B) an organic polyisocyanate compound, said components (A) and (B) being reacted with each other to form a cured product containing a backbone structure represented by the above formula (1) in an amount of 20% by weight or higher, as well as an adhesive for gas-barrier laminate containing the composition.

Also, in view of the second object, the present inventors have found that the polyurethane resin containing the above specific backbone structure and compounds is used to produce a film material that is free from environmental pollution and adverse influences on human body, and exhibits an extremely excellent gas-barrier property, especially maintains the high gas-barrier property even after boiling and retort treatments under a high humidity condition, and also have an excellent adhesion property to a base film.

Namely, in a second aspect of the present invention, there are provided a heat-curing gas-barrier polyurethane resin comprising a cured resin produced by reacting (A) an active hydrogen-containing compound with (B) an organic polyisocyanate compound, said cured product containing the backbone structure represented by the above formula (1) in an amount of 20% by weight or higher, and the components (A) and (B) containing tri- or more functional compounds in an amount of 7% by weight or higher based on a total weight of the components (A) and (B), as well as a gas-barrier film containing the resin.

Further, in view of the third object, the present inventors have found that the paint composition containing the above specific backbone structure not only exhibits excellent properties inherent to the polyurethane resin, but also is applicable to a packaging material requiring a high gas-barrier property. The present invention has been accomplished on the basis of these findings Namely, in a third aspect of the present invention, there are provided a gas-barrier paint comprising as a film-forming component, a gas-barrier paint composition containing (A) an active hydrogen-containing compound and (B) an organic polyisocyanate compound as main components, said composition being cured into a coating film containing the backbone structure represented by the above formula (1) in an amount of 20% by weight or higher, as well as a coating film produced from the paint.

DETAILED DESCRIPTION OF THE INVENTION

Two-Part Liquid Curable Polyurethane Resin Composition

The two-part liquid curable polyurethane resin composition according to the first aspect of the present invention includes a component comprising mainly (A) an active hydrogen-containing compound and a component comprising mainly (B) an organic polyisocyanate compound. The cure product obtained by reacting the components (A) and (B) with each other contains the backbone structure represented by the above formula (1) in an amount of 20% by weight or higher. Since the cured resin contains a large amount of the backbone structure represented by the above formula (1), an adhesive layer formed by the cure resin can exhibit a high gas-barrier property and a good adhesion property.

The active hydrogen-containing compound (A) and the organic polyisocyanate compound (B) constituting the two-part liquid curable polyurethane resin composition are described below.

In the two-part liquid curable polyurethane resin composition of the present invention, the active hydrogen-containing compound (A) is at least one compound selected from the group consisting of (1) alkyleneoxide adducts of polyamine, (2) amido-containing polyols, (3) polyol adducts of polyisocyanate compound, and (4) polyols. These compounds may be in the form of either an aliphatic compound, an alicyclic compound, an aroaliphatic compound or an aromatic compound, and may be appropriately selected therefrom according to applications and properties required in the applications. In order to attain a still higher gas-barrier property and a good adhesion property, among these compounds, preferred are such active hydrogen-containing compounds containing aromatic moieties or alicyclic moieties in a molecule thereof, and more preferred are such active hydrogen-containing compounds containing the backbone structure represented by the above formula (1). Also, the active hydrogen-containing compound contains amino and/or hydroxy end groups, and the total number of active hydrogen atoms contained therein is 2 or more. In order to attain a high gas-barrier property and a good adhesion property, the total number of active hydrogen atoms contained in the active hydrogen-containing compound is preferably 3 or more and more preferably 4 or more.

Examples of the polyamine of the alkyleneoxide adduct of polyamine (1) include aliphatic polyamines such as ethylenediamine, trimethylenediamine, tetramethylenediamine, pentamethylenediamine, hexamethylenediamine, ethanolamine and propanolamine; alicyclic polyamines such as 1,3- or 1,4-bis(aminomethyl) cyclohexane, 4,4'-, 2,4'- or 2,2'-dicyclohexylmethanediamine, isophoronediamine and norbornanediamine; aroaliphatic polyamines such as m- or p-xylylenediamine, 1,3- or 1,4-tetramethylxylylenediamine; and aromatic polyamines such as 2,4- or 2,6-tolylenediamine and 4,4'-, 2,4'- or 2,2'-diaminodiphenylmethane.

Examples of the amido-containing polyol (2) include hydroxyalkylamides or the like.

Examples of the polyisocyanate compound of the polyol adduct of polyisocyanate compound (3) include aromatic polyisocyanates such as m- or p-phenylenediisocyanate, 2,4- or 2,6-tolylenediisocyanate, 4,4'-, 2,4'- or 2,2'-diphenylmethanediisocyanate, 4,4'-toluidinediisocyanate, 4,4'-diphenyletherdiisocyanate and 1,5- or 2,6-naphthalenediisocyanate; aroaliphatic polyisocyanates such as m- or p-xylylenediisocyanate and 1,3- or 1,4-tetramethylxylylenediisocyanate; alicyclic polyisocyanates such as 1,3- or 1,4-cyclohexanediisocyanate, isophoronediisocyanate, 1,3- or 1,4-bis(isocyanatomethyl) cyclohexane, 4,4'-, 2,4'- or 2,2'-dicyclohexylmethanediisocyanate and norbornanediisocyanate; aliphatic polyisocyanates such as hexamethylenediisocyanate; and buret compounds, allophanate compounds, urethodione compounds and isocyanurate compounds of the above-described aromatic polyisocyanates, aroaliphatic polyisocyanates, alicyclic polyisocyanates and aliphatic polyisocyanates.

Examples of the polyol (4) include aliphatic polyols such as ethylene glycol, 1,2- or 1,3-propane diol, 1,3- or 1,4-butane diol, 1,5-pentane diol, 3-methyl-1,5-pentane diol, 1,6-hexane diol, 1,7-heptane diol, 1,8-octane diol, 1,9-nonane diol, 1,10-decane diol, diethylene glycol, triethylene glycol, tetraethylene glycol, dipropylene glycol, neopentyl glycol, glycerol, trimethylol propane and pentaerythritol; alicyclic polyols such as 1,3- or 1,4-cyclohexane dimethanol; and aroaliphatic polyols such as m- or p-xylylene glycol.

The alkyleneoxide contained in the alkyleneoxide adduct of polyamine (1) may contain an optional number of carbon atoms to obtain a composition having a high gas-barrier property and a good adhesion property. However, to attain a still higher gas-barrier property and adhesion property, the number of carbon atoms of the alkyleneoxide is preferably 2 to 4. The molar ratio of the alkyleneoxide to the polyamine reacted may also be optional in order to attain the gas-barrier property. However, to attain a still higher gas-barrier property and adhesion property, the molar ratio ([alkyleneoxide]/[polyamine]) is preferably in the range of 2 to 16.

In the polyol adduct of polyisocyanate compound (3), the polyol added to the polyisocyanate compound may be any compound belonging to the polyol (4). The equivalent ratio between the polyisocyanate compound and the polyol to be reacted may be optional to attain a high gas-barrier property and a good adhesion property. However, to attain a still higher gas-barrier property and a good adhesion property, the equivalent ratio ([polyol]/[polyisocyanate compound] is preferably in the range of 2 to 20. In the reaction, the order of addition of these components is optional, and the respective components may be added by various conventionally known methods such as method of sequentially or simultaneously mixing whole amounts of the components, method of appropriately adding again the organic polyisocyanate compound, if required, during the reaction, or the like. The above reaction may be performed in the presence of an organic solvent, if required. Examples of the organic solvent include toluene, xylene, ethyl acetate, butyl acetate, cellosolve acetate, acetone, methyl ethyl ketone, methyl isobutyl ketone, tetrahydrofuran, dimethylformamide, dimethylacetamide, etc. These organic solvents may be used singly or in combination of any two or more thereof. Further, the reaction may also be performed in the presence of a reaction promoter such as known organometallic compounds (e.g., organolead or organotin compounds) and tertiary amines, if required.

In addition, in order to improve various properties such as flexibility, impact resistance and moist heat resistance, the above active hydrogen-containing compounds (A) may be used singly or in the form of a mixture obtained by blending two or more compounds together at an appropriate mixing ratio.

Of these active hydrogen-containing compounds (A), in order to attain a still higher gas-barrier property and a good adhesion property, preferred are alkyleneoxide adducts of aroaliphatic polyamine, polyol adducts of aroaliphatic polyisocyanate compound and aroaliphatic polyols, and more preferred are alkyleneoxide adducts of aroaliphatic polyamine.

In the two-part liquid curable polyurethane resin composition of the present invention, the organic polyisocyanate compound (B) is a reaction product obtained by reacting (a) a polyfunctional isocyanate compound with (b) a polyfunctional alcohol, or a reaction product obtained by reacting (a) the polyfunctional isocyanate compound, (b) the polyfunctional alcohol and (c) a polyfunctional amine and/or a polyfunctional carboxylic acid with each other, and has two or more NCO end groups. The organic polyisocyanate compound (B) may be in the form of either an aliphatic compound, an alicyclic compound, an aroaliphatic compound or an aromatic compound, and may be appropriately selected therefrom according to application thereof and properties required for the applications. Of these organic polyisocyanate compounds, in order to attain a still higher gas-barrier property and a good adhesion property, preferred are organic polyisocyanate compounds containing aromatic moieties or alicyclic moieties in a molecule thereof, and more preferred are organic polyisocyanate compounds containing the backbone structure represented by the above formula (1) in a molecule thereof. The equivalent ratio between the components (a) and (b) or between (a), (b) and (c) that are reacted with each other, may be optional to attain a high gas-barrier property and an adhesion property. However, in order to attain a still higher gas-barrier property and a good adhesion property, the equivalent ratio ([component (a)]/[component (b)] or [component (a)]/[component (b)+component (c)] is preferably in the range of 2 to 30.

The reaction method for producing the organic polyisocyanate compound (B) may be any of various methods conventionally used for this purpose. More specifically, the order of addition of the respective components is not particularly limited, for example, whole amounts of the respective components may be added and mixed together either sequentially or simultaneously, or the polyfunctional isocyanate compound may be appropriately added again, if required, during the reaction. The above reaction may be performed in the presence of an organic solvent, if required. Examples of the organic solvent include toluene, xylene, ethyl acetate, butyl acetate, cellosolve acetate, acetone, methyl ethyl ketone, methyl isobutyl ketone, tetrahydrofuran, dimethylformamide, dimethylacetamide, etc. These organic solvents may be used singly or in combination of any two or more thereof. Further, the reaction may also be performed in the presence of a reaction promoter such as known organometallic compounds (e.g., organolead or organotin compounds) and tertiary amines, if required. If the reaction product of the components (a) and (b) or the reaction product of the components (a), (b) and (c) contains an excessive amount of unreacted component (a), the reaction product may be subjected to known purification processes such as thin-film distillation and extraction to remove the unreacted component (a) therefrom.

Examples of the polyfunctional isocyanate compound (a) include aromatic polyfunctional isocyanate compounds such as m- or p-phenylenediisocyanate, 2,4- or 2,6-tolylenediisocyanate, 4,4'-, 2,4'- or 2,2'-diphenylmethanediisocyanate, 4,4'-toluidinediisocyanate, 4,4'-diphenyletherdiisocyanate and 1,5- or 2,6-naphthalenediisocyanate; aroaliphatic polyfunctional isocyanate compounds such as m- or p-xylylenediisocyanate and 1,3- or 1,4-tetramethylxylylenediisocyanate; alicyclic polyfunctional isocyanate compounds such as 1,3- or 1,4-cyclohexanediisocyanate, isophorone-diisocyanate, 1,3- or 1,4-bis(isocyanatomethyl)cyclohexane, 4,4'-, 2,4'- or 2,2'-dicyclohexylmethanediisocyanate and norbornanediisocyanate; aliphatic polyfunctional isocyanates such as hexamethylenediisocyanate; and derivatives of these compounds, more specifically buret compounds, allophanate compounds, urethodione compounds and isocyanurate compounds of the above-described aromatic polyfunctional isocyanate compounds, aroaliphatic polyfunctional isocyanate compounds, alicyclic polyfunctional isocyanate compounds and aliphatic polyfunctional isocyanate compounds.

The component (b) is at least one polyfunctional alcohol selected from the group consisting of $C_2$ to $C_{10}$ polyfunctional alcohols, and may be appropriately selected therefrom according to applications thereof and properties required in the applications. Examples of the polyfunctional alcohol (b) include aliphatic polyols such as ethylene glycol, 1,2- or 1,3-propane diol, 1,3- or 1,4-butane diol, 1,5-pentane diol, 3-methyl-1,5-pentane diol, 1,6-hexane diol, 1,7-heptane diol, 1,8-octane diol, 1,9-nonane diol, 1,10-decane diol, diethylene glycol, triethylene glycol, tetraethylene glycol, dipropylene glycol, neopentyl glycol, glycerol, trimethylol propane and pentaerythritol; alicyclic polyols such as 1,3- or 1,4-cyclohexane dimethanol; and aroaliphatic polyols such as m- or p-xylylene glycol.

The component (c) is at least one compound selected from the group consisting of aromatic polyfunctional amines, aroaliphatic polyfunctional amines, alicyclic polyfunctional amines, aliphatic polyfunctional amines, aliphatic alkanol amines, aromatic polyfunctional carboxylic acids, alicyclic polyfunctional carboxylic acids and aliphatic polyfunctional carboxylic acids, and may be appropriately selected therefrom according to applications thereof and properties required in the applications.

Examples of the aromatic polyfunctional amines include 2,4- or 2,6-tolylenediamine, 4,4'-, 2,4'- or 2,2'-diaminodiphenylmethane or the like. Examples of the aroaliphatic polyfunctional amines include m- or p-xylylenediamine, 1,3- or 1,4-tetramethylxylylenediamine or the like. Examples of the alicyclic polyfunctional amines include 1,3- or 1,4-bis(aminomethyl)cyclohexane, 4,4'-, 2,4'- or 2,2'-dicyclohexylmethanediamine, isophoronediamine, norbornanediamine or the like. Examples of the aliphatic polyfunctional amines include ethylenediamine, trimethylenediamine, tetramethylenediamine, pentamethylenediamine, hexamethylenediamine or the like. Examples of the aliphatic alkanol amines include ethanolamine, propanolamine, or the like. Examples of the aromatic polyfunctional carboxylic acids include isophthalic acid, terephthalic acid, 2,6-naphthalenedicarboxylic acid, p-phenylenedicarboxylic acid, trimellitic acid, pyromellitic acid or the like. Examples of the alicyclic polyfunctional carboxylic acids include 1,3-cyclohexanedicarboxylic acid, 1,4-cyclohexanedicarboxylic acid or the like. Examples of the aliphatic polyfunctional carboxylic acids include malonic acid, succinic acid, adipic acid, suberic acid, azelaic acid, sebacic acid, dodecanedioic acid or the like.

In order to attain a still higher gas-barrier property and a good adhesion property, the polyfunctional isocyanate compound (a) used for production of the organic polyisocyanate compound is preferably at least one compound selected from the group consisting of xylylenediisocyanate and derivatives of xylylenediisocyanate, more specifically buret compounds, allophanate compounds, urethodione compounds and isocyanurate compounds of xylylenediisocyanate, and more preferably xylylenediisocyanate.

The components (A) and (B) contained in the two-part liquid curable polyurethane resin composition according to the first aspect of the present invention, are reacted with each other to form a cured resin. The cured resin contains the backbone structure represented by the formula (1) in an amount of 20% by weight or higher, preferably 25% by weight or higher and more preferably 30% by weight or higher. The cured resin containing the backbone structure represented by the formula (1) in an amount of 20% by weight or higher can exhibit a high gas-barrier property and a good adhesion property.

Adhesive for Gas-Barrier Laminate

The two-part liquid curable polyurethane resin composition according to the first aspect of the present invention is usable as an adhesive for gas-barrier laminate. The blending ratios of the components (A) and (B) as main components of the adhesive may be within a normal range ordinarily used for producing the cured product of the two-part liquid curable polyurethane resin composition by reacting the component composed mainly of the active hydrogen-containing compound with the component composed mainly of the organic polyisocyanate compound. More specifically, the ratio of the number of isocyanate groups contained in the organic polyisocyanate compound (B) to the total number of hydroxyl and amino groups contained in the active hydrogen-containing compound (A) is in the range of 0.8 to 2.0, preferably 0.9 to 1.7.

The laminated film prepared using the adhesive for laminate according to the present invention preferably exhibits an initial adhesion strength of 30 g/15 mm or more, more preferably 40 g/15 mm or more and most preferably 50 g/15 mm or more as measured by subjecting films laminated through the adhesive to T-peel test at a peel velocity of 300 mm/min immediately after the lamination. When the initial adhesion strength is insufficient, the resultant laminated film tends to suffer from tunneling or winding defect upon rolling-up the film.

In order to attain a high adhesion strength, the organic polyisocyanate compound (B) is preferably made of a reaction product obtained by reacting (a) a polyfunctional isocyanate compound with (b) a polyfunctional alcohol, or a reaction product obtained by reacting (a) the polyfunctional isocyanate compound, (b) the polyfunctional alcohol and (c) a polyfunctional amine and/or a polyfunctional carboxylic acid, and the reaction product preferably contains oligomers having an increased average molecular weight.

The adhesive for laminate according to the present invention may contain, if required, a wetting agent such as silicone and acrylic compounds as an assistant for moistening the surface of various film materials upon applying the adhesive thereonto. Examples of the suitable wetting agent include BYK331, BYK333, BYK348 and BYK381 all available from BYK Chemie GmbH, etc. The wetting agent is added in an amount of preferably 0.01 to 2.0% by weight based on the total weight of the adhesive composition.

The adhesive for laminate according to the present invention may also contain, if required, an adhesion-imparting agent such as xylene resins, terpene resins, phenol resins, rosin resins, etc., in order to improve an adhesion to various film materials immediately after applying the adhesive thereto. The adhesion-imparting agent is added in an amount of preferably 0.01 to 5.0% by weight based on the total weight of the adhesive composition.

In addition, in order to improve various properties such as gas-barrier property, impact resistance and heat resistance of the adhesive layer made of the adhesive for laminate according to the present invention, an inorganic filler such as silica, alumina, mica, talc, aluminum flakes and glass flakes may be added to the adhesive for laminate.

Such an inorganic filler preferably has a flat plate shape in view of a good transparency of the obtained film. The amount of the inorganic filler added is preferably 0.01 to 10.0% by weight based on the total weight of the adhesive composition.

Further, the adhesive for laminate according to the present invention may contain a coupling agent such as silane coupling agent and titanium coupling agent in order to improve the adhesion strength of the adhesive layer formed of the adhesive for laminate to various film materials such as plastic films, metal foils and papers. The amount of the coupling agent added is preferably 0.01 to 5.0% by weight based on the total weight of the adhesive composition.

Examples of the film materials to be laminated through the adhesive for laminate according to the present invention include polyolefin-based films such as polyethylene and polypropylene films, polyester-based films such as polyethylene terephthalate film, polyamide-based films such as nylon 6, nylon 6,6 and meta-xylyleneadipamide films, poly(meth)acrylic films, polystyrene-based films, ethylene-vinyl acetate copolymer saponificated product (EVOH)-based films, polyvinyl alcohol-based films, papers such as carton, metal foils such as aluminum and copper foils, and films obtained by coating these materials with various polymers. These film materials have a thickness of about 10 to 300 μm, preferably about 10 to 100 μm in view of practical applicability thereof. The film materials made of plastics may be in the form of a monoaxially or biaxially stretched film.

The film materials may be optionally subjected to various surface treatments such as flame treatment and corona discharge treatment to form such an adhesive layer that is free from defects such as film break and crawling. These treatments promote a good adhesion of the adhesive layer to various film materials. Further, the thus surface-treated film materials may be provided thereon with a printed layer, if required. The printed layer may be produced by ordinary printing apparatuses conventionally used for printing on polymer films such as gravure printing machines, flexographic printing machines and offset printing machines. As ink forming the printed layer, there may also be employed various inks conventionally used for forming a printed layer on polymer films which are composed of pigments such as azo-based and phthalocyanine-based pigments, resins such as rosin, polyamides and polyurethane, and a solvent such as ethyl acetate, acetone and methyl ethyl ketone.

Among these film materials, the flexible polymer film used as the sealant layer is preferably selected from polyolefin-based films such as polyethylene film, polypropylene film and ethylene-vinyl acetate copolymer film. The above film has a thickness of about 10 to 300 μm, preferably about 10 to 100 μm in view of practical applicability thereof, and may be subjected to various surface treatments such as flame treatment and corona discharge treatment.

Various film materials may be laminated using the adhesive for laminate according to the present invention by known methods such as dry lamination, non-solvent lamination and extrusion lamination.

The laminating process of coating the adhesive for laminate according to the present invention on the film materials and laminating these film materials through the adhesive may be conducted at the concentration of the adhesive composition and the temperature that are sufficient to obtain a cured product of the two-part liquid curable polyurethane resin as the adhesive layer. The concentration of the adhesive composition and the temperature vary depending upon selected starting materials and laminating process. Namely, the concentration of the adhesive composition is variously changed from the condition where no solvent is used to the condition where the composition is diluted with a certain suitable organic solvent to about 5% by weight, depending upon kinds and molar ratios of the selected raw materials, laminating process, etc. The organic solvent used for diluting the adhesive composition is not particularly restricted as long as they are inert to the reaction. Examples of the organic solvent include aromatic hydrocarbons such as toluene and xylene; ketones such as acetone, methyl ethyl ketone, methyl isobutyl ketone; ethers such as tetrahydrofuran and dioxane; esters such as ethyl acetate and butyl acetate; nitrites such as acetonitrile; and amides such as dimethylformamide and dimethylacetamide. These organic solvents may be used singly or in combination of any two or more thereof. Also, the reaction for production of urethane and/or urea may be performed in the presence of suitable urethanization catalysts such as amine-based catalysts, tin-based catalysts and lead-based catalysts, if required. These urethanization catalysts may be used singly or in combination of any two or more thereof. The adhesive composition may be applied onto the polymer film by any coating methods ordinarily used for this purpose, such as roll-coating, spray-coating, air-knife coating, dip-coating and brush-coating. Of these methods, preferred are roll-coating and spray-coating. For example, there may be used the same roll-coating and spray-coating techniques and facilities as used for laminating polymer films through a polyurethane adhesive component coated thereon.

Next, specific procedures used in the laminating process are explained below. In the dry lamination method, immediately after a dilute solution prepared by dissolving the adhesive for laminate according to the present invention in an organic solvent is applied onto a base film material using rolls such as gravure rolls and dried to remove the organic solvent therefrom, another film material is laminated thereon to form a laminated film. In this case, it is preferred that the thus obtained laminated film is aged at a temperature of from room temperature to 60° C. for a predetermined time period to complete the curing reaction. When the aging is performed for the predetermined time period, it is possible to produce a cured reaction product of the two-part liquid curable polyurethane resin composition which exhibits a high gas-barrier property, at a high yield.

In the non-solvent lamination method, immediately after the adhesive for laminate according to the present invention which is previously heated to a temperature of about 40 to 100° C. is applied onto a base film material using rolls such as gravure rolls, another film material is laminated thereon to form a laminated film. In this case, it is also preferred that the thus obtained laminated film is aged for a predetermined time period like the above dry lamination method.

In the extrusion lamination method, after a dilute solution prepared by diluting the adhesive for laminate according to the present invention as an adhesive assistant (anchor coat agent) which contains as main components a component composed mainly of the active hydrogen-containing compound (A) and a component composed mainly of the organic polyisocyanate compound (B), with an organic solvent, is applied onto a base film material using rolls such as gravure rolls and dried at a temperature of from room temperature to 140° C. to remove the organic solvent therefrom and cure the adhesive, a polymer material melted in an extruder is laminated thereon to form a laminated film. As the polymer material to be melt-laminated, there are preferably used polyolefin-based resins such as low-density polyethylene resin, linear low-density polyethylene resin and ethylene-vinyl acetate copolymer resin.

The adhesive layer formed by coating various film materials with the adhesive for laminate according to the present invention, drying the coating layer, laminating the film materials via the coating layer and heat-treating the resultant laminate, has a thickness of 0.1 to 100 μm, preferably 0.5 to 10 μm in view of practical use. When the thickness of the adhesive layer is less than 0.1 μm, the adhesive layer may fail to exhibit a sufficient gas-barrier property and adhesion property. On the other hand, when the thickness of the adhesive layer is more than 100 μm, it may be difficult to form an adhesive layer having a uniform thickness.

The adhesive for laminate according to the present invention can exhibit not only a good adhesion property to various film materials but also a high gas-barrier property. Therefore, the laminated film produced using the adhesive for laminate according to the present invention can show an extremely high gas-barrier property without using an ordinarily used gas-barrier material such as PVDC coating layer, polyvinyl alcohol (PVA) coating layer, ethylene-vinyl alcohol copolymer (EVOH) film layer, meta-xylyleneadipamide film layer and inorganic deposited film deposited with alumina ($Al_2O_3$) or silica (Si). However, when the adhesive for laminate according to the present invention is further used to laminate the conventional gas-barrier material and the sealant material, it is possible to obtain a laminated film that is more remarkably improved in gas-barrier property. Further, since the cured product of the two-part liquid curable polyurethane resin composition is excellent in toughness and moist heat resistance, it also becomes possible to produce a gas-barrier laminated film that is excellent in impact resistance and resistance to retort treatment.

Thus, the adhesive for laminate according to the present invention can exhibit not only a high gas-barrier property but also a high adhesion property, especially excellent adhesion property to various film materials such as polymers, papers and metals after boiling and retort treatments. Therefore, by using the adhesive for laminate according to the present invention, it is possible to achieve a combined function as gas-barrier layer and adhesive layer merely by one layer. As a result, although the conventional packaging laminated film requires to separately form a gas-barrier layer and an adhesive layer applied between the gas barrier layer and a sealant layer, the use of the adhesive for laminate according to the present invention makes it possible to obtain a packaging laminated film having a high gas-barrier property without separately forming the gas-barrier layer. Further, the adhesive for laminate according to the present invention may also be used as the adhesive layer for bonding the conventional gas-barrier film made of PVDC coating layer, polyvinyl alcohol (PVA) coating layer, ethylene-vinyl alcohol copolymer (EVOH) film layer, meta-xylyleneadipamide film layer and inorganic deposited film deposited with alumina ($A_2O_3$) or silica (Si) to the sealant layer, thereby enabling production of a laminated film exhibiting a more remarkably improved gas-barrier property.

Heat-Curing Gas-Barrier Polyurethane Resin

The heat-curing gas-barrier polyurethane resin according to the second aspect of the present invention contains a cured resin produced by reacting (A) an active hydrogen-containing compound with (B) an organic polyisocyanate compound. The cured resin contains a backbone structure represented by the above formula (1) in an amount of 20% by weight or higher, and the components (A) and (B) contains tri- or more functional compounds in an amount of 7% by weight or higher based on a total amount of the components (A) and (B).

When the heat-curing gas-barrier polyurethane resin of the present invention is used for production of composite films, since the cured resin forming an intermediate layer of the composite film contains a large amount of the backbone structure represented by the above formula (1), the resultant composite film can exhibit a high gas-barrier property as well as a good adhesion property to the base film. Further, since the cured resin contains a large amount of tri- or more functional compounds, the resultant film can also maintain a high gas-barrier property even after boiling and retort treatments under a high humidity condition.

The heat-curing gas-barrier polyurethane resin and the gas-barrier film containing the resin according to the present invention are explained below.

In the heat-curing gas-barrier polyurethane resin of the present invention, the active hydrogen-containing compound (A) is at least one compound selected from the group consisting of (1) polyamines, (2) alkyleneoxide adducts of polyamine, (3) amido-containing polyols, (4) polycarboxylic acids and (5) polyols. These compounds may be in the form of either an aliphatic compound, an alicyclic compound, an aroaliphatic compound or an aromatic compound, and may be appropriately selected therefrom according to applications and properties required in the applications. In order to attain a still higher gas-barrier property and a good adhesion property, among these compounds, preferred are such active hydrogen-containing compounds containing aromatic moieties or alicyclic moieties in a molecule thereof, and more preferred are such active hydrogen-containing compounds containing the backbone structure represented by the above formula (1) in a molecule thereof. The active hydrogen-containing compound contains amino and/or hydroxy end groups, and the total number of active hydrogen atoms contained therein is 2 or more. In order to maintain the high gas-barrier property after boiling and retort treatments under a high humidity condition, the total number of active hydrogen atoms contained in the active hydrogen-containing compound is preferably 3 or more.

Examples of the polyamine (1) as well as the polyamine contained in the alkyleneoxide adduct of polyamide (2) include those compounds exemplified as the polyamide (1) for the two-part liquid curable polyurethane resin composition. Examples of the alkyleneoxide adduct of polyamine (2), the amido-containing polyol (3) and the polyol (5) include those compounds exemplified as the alkyleneoxide adduct of polyamine (1), the amido-containing polyol (2) and the polyol (4), respectively.

Among them, as the alkyleneoxide adduct of polyamide (2), preferred are aroaliphatic polyamines similarly to those of the above two-part liquid curable polyurethane resin composition, and more preferred are alkyleneoxide adducts of xylylenediamine. Also, as the polyol (5), preferred are polyols having 2 to 10 carbon atoms.

Examples of the polycarboxylic acid (4) include aromatic polycarboxylic acids such as isophthalic acid, terephthalic acid, 2,6-naphthalenedicarboxylic acid, p-phenylenedicarboxylic acid, trimellitic acid and pyromellitic acid; alicyclic polycarboxylic acids such as 1,3-cyclohexanedicarboxylic acid and 1,4-cyclohexanedicarboxylic acid; and aliphatic polycarboxylic acids such as malonic acid, succinic acid, adipic acid, suberic acid, azelaic acid, sebacic acid and dodecanedioic acid.

The alkyleneoxide of the alkyleneoxide adduct of polyamine (2) may contain any optional number of carbon atoms to attain a high gas-barrier property and a good adhesion property of the obtained resin. However, to achieve a still higher gas-barrier property and adhesion property and maintain the high gas-barrier property even after boiling and retort treatments under a high humidity condition, the number of carbon atoms contained in the alkyleneoxide is preferably 2 to 4. The molar ratio of the alkyleneoxide to the polyamine reacted is also optional in order to achieve the gas-barrier property. However, to attain a still higher gas-barrier property and a good adhesion property and maintain the high gas-barrier property even after boiling and retort treatments under a high humidity condition, the molar ratio ([alkyleneoxide]/[polyamine]) is preferably in the range of 2 to 16.

The organic polyisocyanate compound (B) used in the heat-curing gas-barrier polyurethane resin of the present invention has two or more NCO end groups, and may be in the form of either an aliphatic compound, an alicyclic compound, an aroaliphatic compound or an aromatic compound. The organic polyisocyanate compound (B) may be appropriately selected from these compounds according to applications thereof and properties required for the applications. Of these organic polyisocyanate compounds, in order to attain a still higher gas-barrier property and a good adhesion property, preferred are organic polyisocyanate compounds containing aromatic moieties or alicyclic moieties in a molecule thereof, and more preferred are organic polyisocyanate compounds containing the backbone structure represented by the above formula (1) in a molecule thereof.

Examples of the organic polyisocyanate compound (B) include those compounds exemplified as the organic polyisocyanate compound (B) for the above two-part liquid curable polyurethane resin composition.

As the organic polyisocyanate compound (B) for the heat-curing gas-barrier polyurethane resin, preferred are xylylenediisocyanate, bis(isocyanatomethyl)cyclohexane and derivatives thereof, and more preferred are xylylenediisocyanate and derivatives thereof.

In the heat-curing gas-barrier polyurethane resin of the present invention, when the tri- or more functional compounds are used as the active hydrogen-containing compound (A) or the organic polyisocyanate compound (B) to be reacted, it is effective to maintain the high gas-barrier property of the heat-curing gas-barrier polyurethane resin even after boiling and retort treatments under a high humidity condition.

The amount of the tri- or more functional compounds used in the components (A) and (B) of the heat-curing gas-barrier polyurethane resin is 7% by weight or higher, preferably 15% by weight or higher, more preferably 20% by weight or higher based on the total weight of the components (A) and (B). The heat-curing gas-barrier polyurethane resin containing the tri- or more functional compounds in an amount of 7% by weight or higher can maintain its high gas-barrier property even after boiling and retort treatments under a high humidity condition.

The tri- or more functional compound is at least one compound selected from the group consisting of buret compounds, allophanate compounds and isocyanurate compounds of aromatic, aroaliphatic, alicyclic and aliphatic diisocyanates, $C_3$ to $C_6$ polyols, alkyleneoxide adducts of polyamine and amido-containing polyols, and may be appropriately selected therefrom according to applications thereof and properties required for the applications. In order to attain a still higher gas-barrier property and a good adhesion property, of these compounds, preferred are such tri- or more functional compounds containing aromatic moieties or alicyclic moieties in a molecule thereof, and more preferred are tri- or more functional compounds containing the backbone structure represented by the above formula (1) in a molecule thereof.

Examples of the tri- or more functional compound as the active hydrogen-containing compound (A) or the organic polyisocyanate compound (B) include aromatic diisocyanate compounds such as m- or p-phenylene-diisocyanate, 2,4- or 2,6-tolylenediisocyanate, 4,4'-, 2,4'- or 2,2'-diphenylmethanediisocyanate, 4,4'-toluidinediisocyanate, 4,4'-diphenylether-diisocyanate and 1,5- or 2,6-naphthalenediisocyanate; aroaliphatic diisocyanate compounds such as m- or p-xylylenediisocyanate and 1,3- or 1,4-tetramethylxylylenediisocyanate; alicyclic diisocyanate compounds such as 1,3- or 1,4-cyclohexanediisocyanate, isophoronediisocyanate, 1,3- or 1,4-bis(isocyanatomethyl) cyclohexane, 4,4'-, 2,4'- or 2,2'-dicyclohexylmethanediisocyanate and norbornanediisocyanate; buret compounds, allophanate compounds and isocyanurate compounds of aliphatic diisocyanate compounds such as hexamethylenediisocyanate; $C_3$ to $C_6$ polyols such as glycerol, trimethylolpropane and pentaerythritol; alkyleneoxide adducts of aliphatic polyamines such as ethylenediamine, trimethylenediamine, tetramethylenediamine, pentamethylenediamine, hexamethylenediamine, ethanolamine and propanolamine, alicyclic polyamines such as 1,3- or 1,4-bis(aminomethyl)cyclohexane, 4,4'-, 2,4'- or 2,2'-dicyclohexylmethanediamine, isophorone-diamine and norbornanediamine, aroaliphatic polyamines such as m- or p-xylylenediamine and 1,3- or 1,4-tetramethylxylylenediamine, and aromatic polyamines such as 2,4- or 2,6-tolylenediamine and 4,4'-, 2,4'- or 2,2'-diaminodiphenylmethane; and amido-containing polyols such as hydroxyalkylamides.

Of these tri- or more functional compounds, preferred are xylylene-diisocyanate, isocyanurate compounds of bis (isocynatomethyl)cyclohexane, glycerol, trimethylolethane, trimethylolpropane, pentaerythritol and alkyleneoxide adducts of xylylenediamine.

In the heat-curing gas-barrier polyurethane resin of the present invention, the cured resin obtained by reacting the active hydrogen-containing compound (A) with the organic polyisocyanate compound (B) contains the backbone structure represented by the above formula (1) in an amount of 20% by weight or higher, preferably 25% by weight or higher, more preferably 35% by weight or higher. When the cured resin contains the backbone structure represented by the above formula (1) in an amount of 20% by weight or higher, it can exhibit a high gas-barrier property and a good adhesion property.

The heat-curing gas-barrier polyurethane resin of the present invention has an oxygen permeability of 500 ml/m$^2$-day-MPa or lower, preferably 200 ml/m$^2$-day-MPa or lower, more preferably 1 to 100 ml/m$^2$-day-MPa as measured at 23° C. and 60% RH with a resin thickness of 10 µm. Also, the heat-curing gas-barrier polyurethane resin of the present invention exhibits an extremely low humidity dependency, and more specifically, the ratio ($R_{60}/R_{100}$) of an oxygen permeability ($R_{60}$) as measured at 23° C. and 60% RH with a resin thickness of 10 µm to an oxygen permeability ($R_{100}$) as measured at 23° C. and 100% RH with a resin thickness of 10 µm is 1/1 to 1/3, preferably 1/1 to 1/2, more preferably 1/1 to 1/1.5. Therefore, the heat-curing gas-barrier polyurethane resin of the present invention is influenced by the humidity merely to an extremely small extent, and can maintain the high gas-barrier property even after boiling and retort treatments under a high humidity condition.

The blending ratio between the active hydrogen-containing compound (A) and the organic polyisocyanate compound (B) as main components of the heat-curing gas-barrier polyurethane resin of the present invention, may be in a normal range generally used for producing the heat-curing gas-barrier polyurethane resin by reacting a component composed mainly of the active hydrogen-containing compound with a component composed mainly of the organic polyisocyanate compound. More specifically, the ratio of the number of isocyanate groups contained in the organic polyisocyanate compound (B) to the total number of hydroxy and amino groups contained in the active hydrogen-containing compound (A) is in the range of 0.8 to 2.0, preferably 0.9 to 1.7.

The reaction between the active hydrogen-containing compound (A) and the organic polyisocyanate compound (B) may be performed in the presence of an organic solvent, if required. Examples of the organic solvent include toluene, xylene, ethyl acetate, butyl acetate, cellosolve acetate, acetone, methyl ethyl ketone, methyl isobutyl ketone, tetrahydrofuran, dimethylformamide, dimethylacetamide or the like. These organic solvents may be used singly or in combination of any two or more thereof. Further, the above reaction may be performed in the presence of a reaction promoter such as known organometallic compounds, e.g., lead and tin compounds, and tertiary amines, if required.

Also, the organic polyisocyanate compound (B) having NCO end functional groups may be previously reacted with a part of the active hydrogen-containing compound (A) to produce a prepolymer thereof. In such a reaction, the order of addition of these components is optional, and the respective components may be added by various conventionally known methods such as method of sequentially or simultaneously mixing whole amounts of the components, method of appropriately adding again the organic polyisocyanate compound, if required, during the reaction, or the like. The reaction for production of the prepolymer may be performed in the presence of an organic solvent, if required. Examples of the organic solvent include toluene, xylene, ethyl acetate, butyl acetate, cellosolve acetate, acetone, methyl ethyl ketone, methyl isobutyl ketone, tetrahydrofuran, dimethylformamide, dimethyl-acetamide or the like. These organic solvents may be used singly or in combination of any two or more thereof. Further, the above reaction may be performed in the presence of a reaction promoter such as known organometallic compounds, e.g., lead and tin compounds, and tertiary amines, if required. If an excessive amount of unreacted organic polyisocyanate compound (B)

remains in the reaction product obtained by the prepolymer production reaction between the organic polyisocyanate compound (B) and a part of the active hydrogen-containing compound (A), the unreacted organic polyisocyanate compound (B) may be removed from the reaction product by known methods such as thin-film distillation and extraction.

The heat-curing gas-barrier polyurethane resin of the present invention may contain, if required, a wetting agent such as silicone and acrylic compounds as an assistant for moistening the surface of various film materials upon applying the resin thereto. Examples of the suitable wetting agent include BYK331, BYK333, BYK348 and BYK381 all available from BYK Chemie GmbH, etc. The wetting agent may be added in an amount of preferably 0.01 to 2.0% by weight based on the total weight of the heat-curing gas-barrier polyurethane resin.

In addition, in order to improve various properties such as gas-barrier property, impact resistance, heat resistance, etc., of the gas-barrier layer made of the heat-curing gas-barrier polyurethane resin of the present invention, an inorganic filler such as silica, alumina, mica, talc, aluminum flakes and glass flakes may be added to the heat-curing gas-barrier polyurethane resin.

Such an inorganic filler preferably has a flat plate shape to ensure a good transparency of the obtained film. The amount of the inorganic filler added is preferably 0.01 to 10.0% by weight based on the total weight of the heat-curing gas-barrier polyurethane resin.

Further, the heat-curing gas-barrier polyurethane resin of the present invention may contain a coupling agent such as silane coupling agent and titanium coupling agent to improve adhesion strength of the gas-barrier layer made of the heat-curing gas-barrier polyurethane resin to various film materials such as plastic films, metal foils and papers. The amount of the coupling agent added is preferably 0.01 to 5.0% by weight based on the total weight of the heat-curing gas-barrier polyurethane resin.

Gas-Barrier Film

The gas-barrier film of the present invention is produced by the following method. That is, a coating solution containing as a film-forming component, a polyurethane resin obtained from the active hydrogen-containing compound (A) and the organic polyisocyanate compound (B) is first prepared. The thus prepared coating solution is applied onto the surface of a flexible polymer film, etc., as a base material and, if required, dried or heat-treated, to form a cured resin of the polyurethane resin (coating film). The preparation of the coating solution may be performed at a concentration of the polyurethane resin composition which is sufficient to obtain a cured resin thereof. The concentration of the polyurethane resin composition varies depending upon selected starting materials. Namely, the concentration of the polyurethane resin composition is variously changed from the condition where no solvent is used, to the condition where the composition is diluted with a certain suitable organic solvent to a concentration of about 5% by weight, depending upon kinds and molar ratios of the selected raw materials, etc.

The organic solvent used for the preparation of the coating solution is not particularly restricted as long as they are inert to the reaction. Examples of the organic solvent include aromatic hydrocarbons such as toluene and xylene; ketones such as acetone, methyl ethyl ketone, methyl isobutyl ketone; ethers such as tetrahydrofuran and dioxane; esters such as ethyl acetate and butyl acetate; nitrites such as acetonitrile; and amides such as dimethylformamide and dimethylacetamide. These organic solvents may be used singly or in combination of any two or more thereof. Also, the reaction for production of urethane and/or urea may be performed in the presence of urethanization catalysts such as amine-based catalysts, tin-based catalysts and lead-based catalysts, if required. These urethanization catalysts may be used singly or in combination of any two or more thereof. The heat-curing gas-barrier polyurethane resin may be applied onto the polymer film by any of ordinary coating methods such as roll-coating, spray-coating, air-knife coating, dip-coating and brush-coating. Of these methods, preferred are roll-coating and spray-coating. For example, there may be used ordinary roll-coating and spray-coating techniques and facilities for coating a polymer film with the heat-curing gas-barrier polyurethane resin.

The heat-curing gas-barrier polyurethane resin of the present invention may be used in the form of a single film molded article or a laminate with a base material, and the final shape or configuration of the heat-curing gas-barrier polyurethane resin upon use may be selected according to applications thereof. The thickness of the gas-barrier layer formed by coating the heat-curing gas-barrier polyurethane resin of the present invention onto various film materials, etc., and drying or heat-treating the coating layer, is practically 0.1 to 100 $\mu$m, preferably 0.5 to 50 $\mu$m. When the thickness of the gas-barrier layer is less than 0.1 $\mu$m, it is difficult to exhibit a sufficient gas-barrier property. On the other hand, when the thickness of the gas-barrier layer is more than 100 $\mu$m, it is difficult to form a gas-barrier layer having a uniform thickness.

The flexible polymer film layer as the base film layer may be made of any suitable material as far as the gas barrier layer made of the heat-curing gas-barrier polyurethane resin of the present invention can be surely held and supported thereon. Examples of the flexible polymer film layer include polyolefin-based films such as polyethylene and polypropylene films, polyester-based films such as polyethylene terephthalate film, polyamide-based films such as nylon 6 and nylon 6,6 films, poly(meth)acrylic films, polystyrene-based films, ethylene-vinyl acetate copolymer saponificated product (EVOH)-based films, polyvinyl alcohol-based films, or the like. Of these film, more preferred are polyolefin-based films, polyester-based films and polyamide-based films.

These films may be in the form of either a monoaxially stretched film or a biaxially stretched film, and have a thickness of practically about 10 to 300 $\mu$m, preferably about 10 to 100 $\mu$m.

These film materials may be desirably subjected to various surface treatments, if required, such as flame treatment and corona discharge treatment to avoid defects such as film break and crawling. These treatments enhances the adhesion of the gas-barrier layer to various film materials. Further, the thus surface-treated film materials may be provided thereon with a printed layer, if required. The printed layer may be produced using ordinary printing apparatuses conventionally used for printing of polymer films such as gravure printing machines, flexographic printing machines and offset printing machines. As ink forming the printed layer, there may also be used various inks conventionally used for forming a printed layer on polymer films which are composed of pigments such as azo-based and phthalocyanine-based pigments, resins such as rosin, polyamides and polyurethane, and a solvent such as ethyl acetate, acetone and methyl ethyl ketone.

Among these film materials, the flexible polymer film used as the sealant layer is preferably selected from polyolefin-based films such as polyethylene film, polypropylene film and ethylene-vinyl acetate copolymer film to ensure a good heat sealability thereof. These films have a thickness of about 10 to 300 μm, preferably about 10 to 100 μm in view of practical use thereof, and may be subjected to various surface treatments such as flame treatment and corona discharge treatment.

The gas-barrier composite film using the heat-curing gas-barrier polyurethane resin of the present invention is composed of the flexible polymer film and the gas-barrier layer that are laminated through or without a printed layer therebetween. More specifically, the gas-barrier layer is laminated onto the surface of the flexible polymer film as a base material which may or may not be provided with the printed layer, through neither adhesive layer nor anchor coat layer. Further, another flexible polymer film is laminated on the surface of the gas-barrier layer without any adhesive layer or anchor coat layer. In addition, a metal layer such as aluminum layer, an oxygen absorbing layer, a paper (carton layer), etc., may be successively laminated on the gas barrier layer, if required. The reason why the composite film can exhibit a good adhesion strength between the flexible polymer film and the gas-barrier layer without the adhesive layer and anchor coat layer is that a large amount of functional groups present in the polyurethane resin cured product forming the gas-barrier layer have a strong interaction with the surface of the flexible polymer film. Since the polyurethane resin cured product forming the gas-barrier layer is excellent in toughness and moist heat resistance, the obtained gas-barrier composite film is also excellent in impact resistance, resistance to retort treatment, etc.

The flexible polymer film layer serving as the sealant layer or the like may be laminated on the surface of the gas-barrier layer by known lamination methods such as dry lamination and extrusion lamination. Namely, in the dry lamination method, immediately after a coating solution containing the polyurethane resin as a film-forming component for the gas-barrier layer is applied onto the flexible polymer base film and then dried to remove a solvent therefrom, another flexible polymer film is laminated onto the surface of the resultant gas-barrier layer to form a laminated film. In this case, it is preferred that the thus obtained laminated film is aged at a temperature of from room temperature to 140° C. for 5 seconds to 2 days for post-curing treatment thereof.

In the extrusion lamination method, after a coating solution containing the polyurethane resin as a film-forming component for the gas-barrier layer is applied onto the flexible polymer base film and then dried and cured at a temperature of from room temperature to 140° C. to remove the solvent therefrom, a polymer material melted in an extruder is laminated on the surface of the resultant gas-barrier layer to form a laminated film. These lamination methods may be used in combination with other methods, if required, and the layer structure of the obtained composite film may vary depending upon applications and configurations thereof.

The gas-barrier composite film of the present invention has such a structure that the flexible polymer film and the gas-barrier layer are laminated through or without a printed layer therebetween. Thus, since it is not necessary to separately form an adhesive layer and an anchor coat layer upon laminating the respective layers, the gas-barrier composite film can be advantageously produced at low costs with a good workability in production process thereof. Further, the composite film can exhibit, in addition to high gas-barrier property, various excellent properties such as transparency, impact resistance and resistance to retort treatment, and the adhesion strength between the respective layers thereof is identical to or higher than that attained by the conventional polyurethane-based adhesive. Therefore, the composite film of the present invention can be used as a halogen-free gas-barrier material in various applications.

Gas-Barrier Paint

The gas-barrier paint according to the third aspect of the present invention contains the active hydrogen-containing compound (A) and the organic polyisocyanate compound (B) as film-forming components. The cured coating film obtained from the gas-barrier paint composition composed mainly of the active hydrogen-containing compound (A) and the organic polyisocyanate compound (B) contains the backbone structure represented by the above formula (1) in an amount of 20% by weight or higher. The coating film prepared from the paint composition contains a large amount of the backbone structure represented by the formula (1) and, therefore, can exhibit a high gas-barrier property and a good adhesion to a base material.

As the active hydrogen-containing compound (A) and the organic polyisocyanate compound (B) in the gas-barrier paint composition of the present invention, there may be used the same compounds as those used for the above two-part liquid curable polyurethane resin composition.

The blending ratios of the active hydrogen-containing compound (A) and the organic polyisocyanate compound (B) as main components of the gas-barrier paint composition may be in such a normal range as generally used for producing the polyurethane resin by reacting the active hydrogen-containing compound (A) with the organic polyisocyanate compound (B). More specifically, the ratio of the number of isocyanate groups contained in the organic polyisocyanate compound (B) to the total number of hydroxy and amino groups contained in the active hydrogen-containing compound (A) is in the range of 0.8 to 3.0, preferably 0.9 to 2.5.

In the gas-barrier paint composition of the present invention, when the active hydrogen-containing compound (A) and the organic polyisocyanate compound (B) coexist for a long period of time, the curing reaction therebetween proceeds. Therefore, it is required to store the curable film-forming components in two or more parts separately from each other. The separately stored liquid components are preferably blended together immediately before use to prepare the gas-barrier paint composition.

The curing reaction of the gas-barrier paint composition may be performed at the concentration of the composition and the temperature that are sufficient to obtain a cured reaction product thereof. The concentration of the gas-barrier paint composition and the curing reaction temperature vary depending upon selected starting materials. Namely, the concentration of the gas-barrier paint composition is variously changed from the condition where no solvent is used, to the condition where the composition is diluted with a certain suitable organic solvent to a concentration of about 5% by weight, depending upon kinds and equivalent ratios of the selected raw materials, etc. Similarly, the curing reaction temperature may be selected from the range of from room temperature to 140° C. As the suitable organic solvent, there may be used the same organic solvents as used for preparing the coating solution for the gas-barrier film. Also, the reaction for production of urethane and/or urea may be performed in the presence of urethanization catalysts such as amine-based catalysts, tin-based catalysts and lead-based catalysts, if required. These urethanization catalysts may be used singly or in combination of any two or more thereof.

The urethane group moieties introduced into the reaction product by the above reaction has a high coagulation force, and the coating film obtained from the gas-barrier paint composition contains a large amount of the backbone structure represented by the above formula (1). For these reasons, the gas-barrier paint can exhibit not only a higher oxygen-barrier property but also a good adhesion property to various base materials such as metals, concrete and plastics.

Also, the gas-barrier paint composition may be blended, if required, with heat-curing resin compositions such as epoxy-based resin compositions, polyacrylic resin compositions and polyurethane-based resin compositions unless the effects of the present invention are adversely influenced by the addition of these compositions.

When the gas-barrier paint composition is applied onto an ordinary base material such as metals, concrete and plastics, the composition may also contain the above-described wetting agent an assistant for moistening the surface of various base materials. In addition, in order to improve various properties such as impact resistance, etc., the above-described inorganic filler may be added to the gas-barrier paint composition. Further, the gas-barrier paint composition may also contain the above-described coupling agent to improve the adhesion strength of the coating film made of the gas-barrier paint composition to the base material.

The gas-barrier paint composition can be directly used as a paint, or may be blended with a solvent or various pigments such as coloring pigments and extender pigments, if required, to prepare a paint.

The paint obtained from the gas-barrier paint composition can also be applied to a base material such as metals and concrete which have been hitherto coated with conventional polyurethane resin paints, for the purposes of rust-proofing, anti-corrosion and aesthetic decoration thereof. Further, the gas-barrier paint of the present invention can be applied onto various gas-permeable base materials requiring a high gas-barrier property to which the conventional polyurethane resin paints are however inapplicable because of its low gas-barrier property. Examples of such base materials include plastic films made of polyolefins, polyesters or polyamides and inorganic deposited films deposited with aluminum, aluminum oxide, or silicon oxide as well as plastic containers, etc., which are used for packaging foodstuffs or drugs.

Also, the gas-barrier paint of the present invention may be used as a primer. The primer is used, for example, between a steel base material and an outer polymer resin layer provided for preventing the base material from being damaged by outside factors which layer, however, shows a poor adhesion to the base material, in order to ensure a still higher adhesion strength therebetween. Namely, the primer has a function for bonding the outer layer to the base material. In order to improve the adhesion between the outer layer and the base material, the gas-barrier paint composition may further contain a tackifier such as xylene resins, terpene resins, phenol resins and rosin resins. The tackfier is preferably added in an amount of 0.01 to 5.0% by weight based on the total weight of the gas-barrier paint composition.

The gas-barrier paint of the present invention can exhibit a high gas-barrier property at such a normal blending ratio as ordinarily used for producing the cured product of polyurethane resins. For this reason, when the gas-barrier paint of the present invention is used, it becomes possible to produce a cured coating film exhibiting, in addition to inherent excellent properties of the polyurethane resins, a high gas-barrier property and a good adhesion property to the base material. The gas-barrier paint of the present invention can also be applied to a base material such as metals and concrete which have been hitherto coated with conventional polyurethane resin paints, for the purposes of rust-proofing of metals as well as anticorrosion of concrete. Further, the gas-barrier paint of the present invention can be applied onto various gas-permeable base materials requiring a high gas-barrier property to which the conventional polyurethane resin paint is however inapplicable because of its low gas-barrier property. Examples of such base materials include plastic films made of polyolefins, polyesters or polyamides as well as plastic containers, etc., which may be used for packaging foodstuffs or drugs.

The present invention will be described in more detail by way of the following examples which should not be construed to limit the scope of the present invention thereto.

The methods for producing (I) the active hydrogen-containing compound and (II) the organic polyisocyanate compound used in the following Examples and Comparative Examples are explained below.

Active Hydrogen-Containing Compound A

One mole of meta-xylylenediamine was charged into a reactor, heated to 50° C. under a nitrogen flow, and dropped with 4 mol of ethyleneoxide for 5 hours. After completion of the dropping, the reaction mixture was stirred at 100° C. for 5 hours to obtain an active hydrogen-containing compound A.

Active Hydrogen-Containing Compound B

One mole of meta-xylylenediamine was charged into a reactor, heated to 50° C. under a nitrogen flow, and dropped with 4 mol of propyleneoxide for 5 hours. After completion of the dropping, the reaction mixture was stirred at 100° C. for 5 hours to obtain an active hydrogen-containing compound B.

Active Hydrogen-Containing Compound C

Hydroxyalkylamide "XL-552" available from Ems Japan Co., Ltd., was used as the active hydrogen-containing compound C.

Active Hydrogen-Containing Compound D

Twenty moles of ethylene glycol were charged into a reactor, heated to 80° C. under a nitrogen flow, and dropped with 1 mol of meta-xylylene-diisocyanate for 1 hour. After completion of the dropping, the reaction mixture was stirred at 80° C. for 2 hours and then distilled at 180° C. under a vacuum degree of 0.133 kPa using a 0.03 $m^2$ thin-film distillation device while feeding the mixture at a velocity of 5 g/min to thereby obtain the active hydrogen-containing compound D containing residual ethylene glycol in an amount of 0.6% by weight.

Active Hydrogen-Containing Compound E

Ethylene glycol was used as the active hydrogen-containing compound E.

Active Hydrogen-Containing Compound F

A polyester resin-based adhesive for retort "AD-817" commercially available from Toyo Morton Co., Ltd., was used as the active hydrogen-containing compound F.

Active Hydrogen-Containing Compound G

Twenty moles of ethylene glycol were charged into a reactor, heated to 80° C. under a nitrogen flow, and dropped with 1 mol of meta-xylylene-diisocyanate for 1 hour. After completion of the dropping, the reaction mixture was stirred at 80° C. for 2 hours and then distilled at 180° C. under a vacuum degree of 0.133 kPa using a 0.03 $m^2$ thin-film distillation device while feeding the mixture at a velocity of 5 g/min to thereby obtain the active hydrogen-containing compound G containing residual ethylene glycol in an amount of 0.6% by weight.

Active Hydrogen-Containing Compound H
As the active hydrogen-containing compound H was used 1,4-butane diol.

Active Hydrogen-Containing Compound I
"ACRYDICK A801" available from Dai-Nippon Ink Kagaku Kogyo Co., Ltd., was used as the active hydrogen-containing compound I.

Organic Polyisocyanate Compound A
Eight moles of meta-xylylenediisocyanate were charged into a reactor, heated to 80° C. under a nitrogen flow, and then dropped with 1 mol of ethylene glycol for 1 hour. After completion of the dropping, the reaction mixture was stirred at 80° C. for 2 hours and then distilled at 180° C. under a vacuum degree of 0.133 kPa using a 0.03 m² thin-film distillation device while feeding the mixture at a velocity of 5 g/min to thereby obtain the organic polyisocyanate compound A containing residual meta-xylylenediisocyanate in an amount of 0.8% by weight.

Organic Polyisocyanate Compound B
Five moles of meta-xylylenediisocyanate were charged into a reactor, heated to 80° C. under a nitrogen flow, and then dropped with 1 mol of diethylene glycol for 1 hour. After completion of the dropping, the reaction mixture was stirred at 80° C. for 2 hours and then distilled at 180° C. under a vacuum degree of 0.133 kPa using a 0.03 m² thin-film distillation device while feeding the mixture at a velocity of 5 g/min to thereby obtain the organic polyisocyanate compound B containing residual meta-xylylenediisocyanate in an amount of 0.5% by weight.

Organic Polyisocyanate Compound C
Twelve moles of meta-xylylenediisocyanate were charged into a reactor, heated to 80° C. under a nitrogen flow, and then dropped with 1 mol of glycerol for 5 hours. After completion of the dropping, the reaction mixture was stirred at 80° C. for 2 hours and then distilled at 180° C. under a vacuum degree of 0.133 kPa using a 0.03 m² thin-film distillation device while feeding the mixture at a velocity of 3 g/min to thereby obtain the organic polyisocyanate compound C containing residual meta-xylylenediisocyanate in an amount of 1.0% by weight.

Organic Polyisocyanate Compound D
Five moles of meta-xylylenediisocyanate and 5 mol of meta-xylylene glycol were charged into a reactor, and then heated to 80° C. under a nitrogen flow, followed by stirring the mixture for 5 hours. Thereafter, the resultant reaction mixture was distilled at 180° C. under a vacuum degree of 0.133 kPa using a 0.03 m² thin-film distillation device while feeding the mixture at a velocity of 5 g/min to thereby obtain the organic polyisocyanate compound D containing residual meta-xylylenediisocyanate in an amount of 0.3% by weight.

Organic Polyisocyanate Compound E
Five moles of meta-xylylenediisocyanate were charged into a reactor, heated to 80° C. under a nitrogen flow, and then dropped with a mixed solution composed of 0.75 mol of diethylene glycol and 0.25 mol of ethanolamine for 3 hours. After completion of the dropping, the resultant reaction mixture was stirred at 80° C. for 2 hours and then distilled at 180° C. under a vacuum degree of 0.133 kPa using a 0.03 m² thin-film distillation device while feeding the mixture at a velocity of 5 g/min to thereby obtain the organic polyisocyanate compound E containing residual meta-xylylenediisocyanate in an amount of 0.5% by weight.

Organic Polyisocyanate Compound F
Six moles of meta-xylylenediisocyanate were charged into a reactor, heated to 80° C. under a nitrogen flow, and then dropped with 1 mol of trimethylolpropane for 3 hours. After completion of the dropping, the resultant reaction mixture was stirred at 80° C. for 2 hours and then distilled at 180° C. under a vacuum degree of 0.133 kPa using a 0.03 m² thin-film distillation device while feeding the mixture at a velocity of 5 g/min to thereby obtain the organic polyisocyanate compound F containing residual meta-xylylenediisocyanate in an amount of 0.5% by weight.

Organic Polyisocyanate Compound G
Six moles of tolylenediisocyanate were charged into a reactor, heated to 80° C. under a nitrogen flow, and then dropped with 1 mol of trimethylolpropane for 3 hours. After completion of the dropping, the resultant reaction mixture was stirred at 80° C. for 2 hours and then distilled at 180° C. under a vacuum degree of 0.133 kPa using a 0.03 m² thin-film distillation device while feeding the mixture at a velocity of 5 g/min to thereby obtain the organic polyisocyanate compound G containing residual tolylenediisocyanate in an amount of 0.6% by weight.

Organic Polyisocyanate Compound H
Three moles of bis(isocyanatomethyl)cyclohexane and 3 mol of meta-xylylenediisocyanate were charged into a reactor, heated to 80° C. under a nitrogen flow, and then dropped with 1 mol of trimethylolpropane for 3 hours. After completion of the dropping, the resultant reaction mixture was stirred at 80° C. for 2 hours and then distilled at 180° C. under a vacuum degree of 0.133 kPa using a 0.03 m² thin-film distillation device while feeding the mixture at a velocity of 5 g/min to thereby obtain the organic polyisocyanate compound H containing residual bis(isocyanatomethyl)cyclohexane and meta-xylylenediisocyanate in a total amount of 0.5% by weight.

Organic Polyisocyanate Compound I
Six moles of isophoronediisocyanate were charged into a reactor, heated to 80° C. under a nitrogen flow, and then dropped with 1 mol of trimethylolpropane for 3 hours. After completion of the dropping, the resultant reaction mixture was stirred at 80° C. for 2 hours and then distilled at 180° C. under a vacuum degree of 0.133 kPa using a 0.03 m² thin-film distillation device while feeding the mixture at a velocity of 5 g/min to thereby obtain the organic polyisocyanate compound I containing residual isophoronediisocyanate in an amount of 0.7% by weight.

Organic Polyisocyanate Compound J
Six moles of hexamethylenediisocyanate were charged into a reactor, heated to 80° C. under a nitrogen flow, and then dropped with 1 mol of trimethylolpropane for 3 hours. After completion of the dropping, the resultant reaction mixture was stirred at 80° C. for 2 hours and then distilled at 180° C. under a vacuum degree of 0.133 kPa using a 0.03 m² thin-film distillation device while feeding the mixture at a velocity of 5 g/min to thereby obtain the organic polyisocyanate compound J containing residual hexamethylenediisocyanate in an amount of 0.4% by weight.

Organic Polyisocyanate Compound K
A polyisocyanate-based adhesive for retort "CAT-RT86" commercially available from Toyo Morton Co., Ltd., was used as the active hydrogen-containing compound K.

Organic Polyisocyanate Compound L
Four moles of meta-xylylenediisocyanate were charged into a reactor, heated to 80° C. under a nitrogen flow, and then dropped with 1 mol of ethylene glycol for 2 hours. After completion of the dropping, the resultant reaction mixture was stirred at 80° C. for 2 hours and then distilled at 180° C. under a vacuum degree of 0.133 kPa using a 0.03 m² thin-film distillation device while feeding the mixture at a velocity of 5 g/min to thereby obtain the organic polyisocyanate compound L containing residual meta-xylylenediisocyanate in an amount of 0.8% by weight.

Organic Polyisocyanate Compound M

Four moles of meta-xylylenediisocyanate were charged into a reactor, heated to 80° C. under a nitrogen flow, and then dropped with 1 mol of diethylene glycol for 2 hours. After completion of the dropping, the resultant reaction mixture was stirred at 80° C. for 2 hours and then distilled at 180° C. under a vacuum degree of 0.133 kPa using a 0.03 $m^2$ thin-film distillation device while feeding the mixture at a velocity of 5 g/min to thereby obtain the organic polyisocyanate compound M containing residual meta-xylylenediisocyanate in an amount of 0.5% by weight.

Organic Polyisocyanate Compound N

Ten moles of meta-xylylenediisocyanate were charged into a reactor, heated to 80° C. under a nitrogen flow, and then dropped with 1 mol of glycerol for 2 hours. After completion of the dropping, the resultant reaction mixture was stirred at 80° C. for 2 hours and then distilled at 180° C. under a vacuum degree of 0.133 kPa using a 0.03 $m^2$ thin-film distillation device while feeding the mixture at a velocity of 3 g/min to thereby obtain the organic polyisocyanate compound N containing residual meta-xylylenediisocyanate in an amount of 1.0% by weight.

Organic Polyisocyanate Compound O

Eight moles of meta-xylylenediisocyanate were charged into a reactor, heated to 80° C. under a nitrogen flow, and then dropped with 1 mol of trimethylolpropane for 3 hours. After completion of the dropping, the resultant reaction mixture was stirred at 80° C. for 2 hours and then distilled at 180° C. under a vacuum degree of 0.133 kPa using a 0.03 $m^2$ thin-film distillation device while feeding the mixture at a velocity of 5 g/min to thereby obtain the organic polyisocyanate compound O containing residual meta-xylylenediisocyanate in an amount of 0.5% by weight.

Organic Polyisocyanate Compound P

Six moles of tolylenediisocyanate were charged into a reactor, heated to 80° C. under a nitrogen flow, and then dropped with 1 mol of trimethylolpropane for 3 hours. After completion of the dropping, the resultant reaction mixture was stirred at 80° C. for 2 hours and then distilled at 180° C. under a vacuum degree of 0.133 kPa using a 0.03 $m^2$ thin-film distillation device while feeding the mixture at a velocity of 5 g/min to thereby obtain the organic polyisocyanate compound P containing residual tolylenediisocyanate in an amount of 0.6% by weight.

Organic Polyisocyanate Compound Q

Three moles of bis(isocyanatomethyl)cyclohexane and 3 mol of meta-xylylenediisocyanate were charged into a reactor, heated to 80° C. under a nitrogen flow, and then dropped with 1 mol of trimethylolpropane for 3 hours. After completion of the dropping, the resultant reaction mixture was stirred at 80° C. for 2 hours and then distilled at 180° C. under a vacuum degree of 0.133 kPa using a 0.03 $m^2$ thin-film distillation device while feeding the mixture at a velocity of 5 g/min to thereby obtain the organic polyisocyanate compound Q containing residual bis(isocyanatomethyl)cyclohexane and meta-xylylenediisocyanate in a total amount of 0.5% by weight.

Organic Polyisocyanate Compound R

Six moles of isophoronediisocyanate were charged into a reactor, heated to 80° C. under a nitrogen flow, and then dropped with 1 mol of trimethylolpropane for 3 hours. After completion of the dropping, the resultant reaction mixture was stirred at 80° C. for 2 hours and then distilled at 180° C. under a vacuum degree of 0.133 kPa using a 0.03 $m^2$ thin-film distillation device while feeding the mixture at a velocity of 5 g/min to thereby obtain the organic polyisocyanate compound R containing residual isophoronediisocyanate in an amount of 0.7% by weight.

Organic Polyisocyanate Compound S

Six moles of hexamethylenediisocyanate were charged into a reactor, heated to 80° C. under a nitrogen flow, and then dropped with 1 mol of trimethylolpropane for 3 hours. After completion of the dropping, the resultant reaction mixture was stirred at 80° C. for 2 hours and then distilled at 180° C. under a vacuum degree of 0.133 kPa using a 0.03 $m^2$ thin-film distillation device while feeding the mixture at a velocity of 5 g/min to thereby obtain the organic polyisocyanate compound S containing residual hexamethylenediisocyanate in an amount of 0.4% by weight.

Organic Polyisocyanate Compound T

As the organic polyisocyanate compound T was used an isocyanurate compound of hexamethylenediisocyanate "SUMIJOULE N-3500" available from Sumitomo Bayer Urethane Co., Ltd.

The gas-barrier property, lamination strength, etc., of the laminated film and the gas-barrier film (composite film) were measured and evaluated by the following methods.

Oxygen Permeability (ml/$m^2$-day-MPa)

The oxygen permeability of the laminated film was measured at 23° C. and a relative humidity (RH) of 60% using an oxygen permeability measuring device "OX-TRAN 10/50A" available from Modern Control Inc. The oxygen permeability of the gas-barrier film was measured at a relative humidity of each of 80%, 90% and 100%.

Impact Resistance (Oxygen Permeability After Gelbo Treatment (ml/$m^2$-day-MPa))

The laminated film was twisted 360° 500 times by Gelbo Flex Tester available from Rigaku Kogyo Sha Co., Ltd., and the oxygen permeability thereof was measured at 23° C. and a relative humidity (RH) of 60%.

Oxygen Permeability After Retort Treatment (ml/$m^2$-day-MPa))

The laminated film was retort-treated at 121° C. for 30 minutes using Retort Food Autoclave available from Tomy Co., Ltd., and the oxygen permeability thereof was measured at 23° C. and a relative humidity (RH) of 60%.

Water Vapor Permeability (g/$m^2$-day))

The water vapor permeability of the laminated film was measured at 40° C. and a relative humidity (RH) of 90% according to the method prescribed in JIS Z-0208.

Appearance

The appearance of the laminated film was visually observed and evaluated.

Initial Adhesion Strength (g/15 mm)

The laminated film was subjected to T-peel test immediately after the lamination to measure the adhesion (peel) strength thereof at a peel velocity of 300 mm/min.

Lamination Strength After Aging (g/15 mm)

According to the method prescribed in JIS K-6854, the laminated film was aged at 40° C. for 3 days, and then subjected to T-peel test to measure the lamination (peel) strength thereof at a peel velocity of 300 mm/min.

Lamination Strength After Boiling Treatment (g/15 mm)

According to the method prescribed in JIS K-6854, the laminated film was aged at 40° C. for 3 days, dipped in warm water at 90° C. for 30 minutes, and subjected to T-peel test to measure the lamination (peel) strength thereof at a peel velocity of 300 mm/min.

Lamination Strength After Retort Treatment (g/15 mm)

According to the method prescribed in JIS K-6854, the laminated film was aged at 40° C. for 3 days, retort-treated at 121° C. for 30 minutes using Retort Food Autoclave available from Tomy Co., Ltd., and then subjected to T-peel test to measure the lamination (peel) strength thereof at a peel velocity of 300 mm/min.

In addition, properties of a coating film prepared from the gas-barrier paint were measured and evaluated by the following methods.

Oxygen Permeability (ml-mm/m$^2$-day-MPa)

The oxygen permeability of the coated plastic film was measured at 23° C. and a relative humidity of 60% using an oxygen permeability measuring device "OX-TRAN 10/50A" available from Modern Control Inc. The oxygen permeability of the coating layer formed on the plastic base film was calculated from the following formula:

$$1/R_1 = 1/R_2 + DFT/P$$

wherein $R_1$=Oxygen permeability of the coated plastic film (ml/m$^2$-day-MPa);

$R_2$=Oxygen permeability of the base film (ml/m$^2$-day-MPa);

DFT=Thickness of the coating layer (mm); and

P=Oxygen permeability of the coating layer (ml-mm/m$^2$-day-MPa).

The paint solution and base material were used under the following conditions.

Base Material: Polyethylene terephthalate film ("LUMILAR" available from Toray Co., Ltd.; thickness: 100 μm)

Coating: Using a bar coater No. 24

Solid content of paint solution: 40%

Water Vapor Permeability (g-mm/m$^2$-day)

According to the method prescribed in JIS Z-0208, the water vapor permeability of the coated plastic film was measured at 40° C. and a relative humidity of 90%. The water vapor permeability of the coating layer formed on the plastic base film was calculated from the same formula as used for the calculation of the oxygen permeability.

The paint solution and base material were used under the following conditions.

Base Material: Polyethylene terephthalate film ("LUMILAR" available from Toray Co., Ltd.; thickness: 100 μm)

Coating: Using a bar coater No. 8

Solid content of paint solution: 40%

Adhesion Strength of Coating Film

A steel plate was coated with the paint, and the resultant coating film was cross-cut by a cutting knife to draw 11 lines in each of transverse and vertical directions at intervals of 1 mm on the coated steel plate, thereby forming a grid including 100 squares of 1 mm$^2$. Then, an adhesive tape was laminated onto the coating film and rapidly peeled off therefrom. The adhesion strength of the coating film is expressed by the number of the squares that still remained adhered to the steel plate after the peel test (according to JIS K5600).

The paint solution and base material were used under the following conditions.

Base Material: Cold-rolled steel plate (JIS G3141; 70×150×0.6 mm) finished by sanding (#240) and then washed with xylene Coating: Using a 200 μm doctor blade Solid content of paint solution: 75%

Chemical Resistance

The steel plate was coated with the paint, and then uncoated portions of the coated steel plate were further coated with paraffin. The thus formed coated steel plate was successively dipped in distilled water, 10% sulfuric acid, 10% acetic acid, 10% sodium hydroxide, and toluene at 23° C., or sprayed with brine (5 wt. % sodium chloride) at 35° C., and allowed to stand for observing the change in appearance thereof after one week. The appearance of the coating film before and after dipping in the chemical solutions was visually observed and evaluated according to the following four ratings:

Ex: No change occurred; G: Initial appearance substantially maintained;

F: Slight change occurred; P: Change occurred

The paint solution and base material were used under the following conditions.

Base Material: Cold-rolled steel plate (JIS G3141; 70×150×0.6 mm) finished by sanding (#240) and then washed with xylene Coating: Using a 200 μm doctor blade Solid content of paint solution: 75%

A: Examples and Comparative Examples for Laminated Films Using an Adhesive Made of Two-Part Liquid Curable Polyurethane Resin Composition

EXAMPLE 1

One hundred parts by weight of the active hydrogen-containing compound A and 342 parts by weight of the organic polyisocyanate compound A were mixed with each other, and then a mixed solution containing acetone and ethyl acetate at a ratio of 1:0.3 was added to the mixture to prepare a liquid mixture having a solid content of 35% by weight. The obtained liquid mixture was mixed with 0.02 part by weight of an acrylic wetting agent "BYK381" available from BYK Chemie GmbH, and intimately stirred together to prepare a coating solution.

The thus obtained coating solution was applied onto a 20 μm-thick stretched polypropylene film using a bar coater No. 6 in a coating amount of 3 g/m$^2$ (solid content), dried at 85° C. for 10 seconds, laminated on a 30 μm-thick polypropylene film using nip rolls, and then aged at 40° C. for 3 days to obtain a laminated film. It was confirmed that the content of the backbone structure represented by the formula (1) in the adhesive layer was 55.3% by weight.

The thus obtained laminated film was tested to evaluate a gas barrier property before treatments, a gas-barrier property after Gelbo treatment, a water vapor permeability and an adhesion strength immediately after lamination. The results are shown in Table 1.

Separately, the above coating solution was applied onto a 25 μm-thick stretched nylon film using a bar coater No. 6 in a coating amount of 3 g/m$^2$ (solid content), dried at 85° C. for 10 seconds, laminated on a 70 μm-thick polypropylene film using nip rolls, and then aged at 40° C. for 3 days to obtain a laminated film. It was confirmed that the content of the backbone structure represented by the formula (1) in the adhesive layer was 55.3% by weight.

The thus obtained laminated film was tested to evaluate respective lamination strengths after aging, boiling treatment and retort treatment. The results are shown in Table 2.

EXAMPLE 2

The same procedure as in Example 1 was repeated except for using 401 parts by weight of the organic polyisocyanate compound B instead of the organic polyisocyanate compound A. As a result, it was confirmed that the content of the backbone structure represented by the formula (1) in the adhesive layer was 48.0% by weight. The results are shown in Tables 1 and 2.

EXAMPLE 3

The same procedure as in Example 1 was repeated except for using 347 parts by weight of the organic polyisocyanate compound C instead of the organic polyisocyanate compound A. As a result, it was confirmed that the content of the backbone structure represented by the formula (1) in the adhesive layer was 53.6% by weight. The results are shown in Tables 1 and 2.

EXAMPLE 4

The same procedure as in Example 1 was repeated except for using 428 parts by weight of the organic polyisocyanate compound D instead of the organic polyisocyanate compound A. As a result, it was confirmed that the content of the backbone structure represented by the formula (1) in the adhesive layer was 45.7% by weight. The results are shown in Tables 1 and 2.

EXAMPLE 5

The same procedure as in Example 1 was repeated except for using 368 parts by weight of the organic polyisocyanate compound E instead of the organic polyisocyanate compound A. As a result, it was confirmed that the content of the backbone structure represented by the formula (1) in the adhesive layer was 50.3% by weight. The results are shown in Tables 1 and 2.

EXAMPLE 6

The same procedure as in Example 1 was repeated except for using 429 parts by weight of the organic polyisocyanate compound F instead of the organic polyisocyanate compound A. As a result, it was confirmed that the content of the backbone structure represented by the formula (1) in the adhesive layer was 45.6% by weight. The results are shown in Tables 1 and 2.

EXAMPLE 7

The same procedure as in Example 1 was repeated except for using 452 parts by weight of the organic polyisocyanate compound H instead of the organic polyisocyanate compound A. As a result, it was confirmed that the content of the backbone structure represented by the formula (1) in the adhesive layer was 23.4% by weight. The results are shown in Tables 1 and 2.

EXAMPLE 8

The same procedure as in Example 1 was repeated except for using 100 parts by weight of the active hydrogen-containing compound B instead of the active hydrogen-containing compound A and using the organic polyisocyanate compound A in an amount of 295 parts by weight. As a result, it was confirmed that the content of the backbone structure represented by the formula (1) in the adhesive layer was 51.6% by weight. The results are shown in Tables 1 and 2.

EXAMPLE 9

The same procedure as in Example 1 was repeated except for using 100 parts by weight of the active hydrogen-containing compound C instead of the active hydrogen-containing compound A and using the organic polyisocyanate compound A in an amount of 322 parts by weight. As a result, it was confirmed that the content of the backbone structure represented by the formula (1) in the adhesive layer was 43.6% by weight. The results are shown in Tables 1 and 2.

EXAMPLE 10

The same procedure as in Example 1 was repeated except for using 100 parts by weight of the active hydrogen-containing compound D instead of the active hydrogen-containing compound A and using 217 parts by weight of the organic polyisocyanate compound F instead of the organic polyisocyanate compound A. As a result, it was confirmed that the content of the backbone structure represented by the formula (1) in the adhesive layer was 60.1% by weight. The results are shown in Tables 1 and 2.

EXAMPLE 11

The same procedure as in Example 1 was repeated except for using 100 parts by weight of the active hydrogen-containing compound E instead of the active hydrogen-containing compound A and using 1,095 parts by weight of the organic polyisocyanate compound F instead of the organic polyisocyanate compound A. As a result, it was confirmed that the content of the backbone structure represented by the formula (1) in the adhesive layer was 42.1% by weight. The results are shown in Tables 1 and 2.

COMPARATIVE EXAMPLE 1

The same procedure as in Example 1 was repeated except for using 418 parts by weight of the organic polyisocyanate compound G instead of the organic polyisocyanate compound A. As a result, it was confirmed that the content of the backbone structure represented by the formula (1) in the adhesive layer was 9.3% by weight. The results are shown in Tables 1 and 2.

COMPARATIVE EXAMPLE 2

The same procedure as in Example 1 was repeated except for using 480 parts by weight of the organic polyisocyanate compound I instead of the organic polyisocyanate compound A. As a result, it was confirmed that the content of the backbone structure represented by the formula (1) in the adhesive layer was 8.3% by weight. The results are shown in Tables 1 and 2.

COMPARATIVE EXAMPLE 3

The same procedure as in Example 1 was repeated except for using 389 parts by weight of the organic polyisocyanate compound J instead of the organic polyisocyanate compound A. As a result, it was confirmed that the content of the backbone structure represented by the formula (1) in the adhesive layer was 9.9% by weight. The results are shown in Tables 1 and 2.

COMPARATIVE EXAMPLE 4

The same procedure as in Example 1 was repeated except for using 100 parts by weight of the active hydrogen-containing compound F instead of the active hydrogen-containing compound A and using 10 parts by weight of the organic polyisocyanate compound K instead of the organic polyisocyanate compound A. As a result, it was confirmed that the content of the backbone structure represented by the formula (1) in the adhesive layer was 0% by weight. The results are shown in Tables 1 and 2.

TABLE 1-1

|  | Appearance | Oxygen permeability (ml/m$^2$ · day · MPa) | Water vapor permeability (g/m$^2$ · day) |
| --- | --- | --- | --- |
| Example 1 | Transparent | 100 | 4 |
| Example 2 | Transparent | 140 | 4 |
| Example 3 | Transparent | 130 | 4 |
| Example 4 | Transparent | 160 | 4 |

TABLE 1-1-continued

| | Appearance | Oxygen permeability (ml/m² · day · MPa) | Water vapor permeability (g/m² · day) |
|---|---|---|---|
| Example 5 | Transparent | 120 | |
| Example 6 | Transparent | 200 | 4 |
| Example 7 | Transparent | 250 | 4 |
| Example 8 | Transparent | 150 | 4 |
| Example 9 | Transparent | 160 | 4 |
| Example 10 | Transparent | 100 | 4 |
| Example 11 | Transparent | 150 | 4 |
| Comparative Example 1 | Transparent | 1,260 | 4 |
| Comparative Example 2 | Transparent | 2,700 | 4 |
| Comparative Example 3 | Transparent | 2,000 | 4 |
| Comparative Example 4 | Transparent | 10,000 | 200 |

TABLE 1-2

| | Oxygen permeability after Gelbo treatment (ml/m² · day · MPa) | Oxygen permeability after retort treatment (ml/m² · day · MPa) | Initial adhesion strength (g/15 mm) |
|---|---|---|---|
| Example 1 | 120 | 100 | 40 |
| Example 2 | 140 | 140 | 60 |
| Example 3 | 140 | 130 | 100 |
| Example 4 | 160 | 160 | 70 |
| Example 5 | 130 | 120 | 60 |
| Example 6 | 200 | 200 | 80 |
| Example 7 | 250 | 250 | 120 |
| Example 8 | 160 | 150 | 50 |
| Example 9 | 160 | 160 | 60 |
| Example 10 | 110 | 100 | 90 |
| Example 11 | 150 | 150 | 110 |
| Comparative Example 1 | 5,600 | 1,500 | 20 |
| Comparative Example 2 | 5,800 | 3,300 | 30 |
| Comparative Example 3 | 2,200 | 2,500 | 10 |
| Comparative Example 4 | 10,000 | >10,000 | 110 |

TABLE 2

| | Lamination strength after aging (g/15 mm) | Lamination strength after boiling treatment (g/15 mm) | Lamination strength after retort treatment (g/15 mm) |
|---|---|---|---|
| Example 1 | 850 | 800 | 750 |
| Example 2 | 900 | 800 | 800 |
| Example 3 | 900 | 850 | 800 |
| Example 4 | 850 | 800 | 850 |
| Example 5 | 950 | 900 | 900 |
| Example 6 | 800 | 750 | 800 |
| Example 7 | 850 | 800 | 850 |
| Example 8 | 900 | 800 | 850 |
| Example 9 | 850 | 750 | 800 |
| Example 10 | 850 | 800 | 800 |
| Example 11 | 800 | 700 | 800 |
| Comparative Example 1 | 400 | 200 | 200 |
| Comparative Example 2 | 300 | 100 | 150 |
| Comparative Example 3 | 200 | 100 | 100 |
| Comparative Example 4 | 800 | 500 | 600 |

B: Examples and Comparative Examples for Heat-curing Gas-Barrier Polyurethane Resin and Gas-Barrier Films Containing the Resin

EXAMPLE 12

One hundred parts by weight of the active hydrogen-containing compound A and 342 parts by weight of the organic polyisocyanate compound A were mixed with a mixed solution containing acetone and ethyl acetate at a ratio of 1:0.3 to prepare a liquid mixture having a solid content of 35% by weight. The obtained liquid mixture was mixed with 0.02 part by weight of an acrylic wetting agent "BYK381" available from BYK Chemie GmbH, and intimately stirred together to prepare a coating solution. It was confirmed that the content of tri- or more functional compounds in the coating solution was 26.5% by weight based on the total weight of the active hydrogen-containing compound and the organic polyisocyanate compound.

The thus obtained coating solution was applied onto a 20 µm-thick stretched polypropylene film using a bar coater No. 6 in a coating amount of 3 g/m² (solid content), dried at 85° C. for 10 seconds, laminated on a 30 µm-thick polypropylene film using nip rolls, and then aged at 40° C. for 3 days to obtain a composite film. It was confirmed that the content of the backbone structure represented by the formula (1) in the gas-barrier layer was 55.3% by weight.

The thus obtained composite film was tested to evaluate a gas-barrier property before treatments, a gas-barrier property after Gelbo treatment, a water vapor permeability, a gas-barrier property after retort treatment and an adhesion strength immediately after lamination. The results are shown in Tables 3 and 4.

Separately, the above coating solution was applied onto a 25 µm-thick stretched nylon film using a bar coater No. 6 in a coating amount of 3 g/m² (solid content), dried at 85° C. for 10 seconds, laminated on a 70 µm-thick polypropylene film using nip rolls, and then aged at 40° C. for 3 days to obtain a composite film. It was confirmed that the content of the backbone structure represented by the formula (1) in the adhesive layer was 55.3% by weight.

The thus obtained composite film was tested to evaluate respective lamination strengths after aging, boiling treatment and retort treatment. The results are shown in Table 5.

EXAMPLE 13

The same procedure as in Example 12 was repeated except for using 401 parts by weight of the organic polyisocyanate compound B instead of the organic polyisocyanate compound A. As a result, it was confirmed that the content of the backbone structure represented by the formula (1) in the adhesive layer was 48.0% by weight, and the content of the tri-or more functional compounds was 23.0% by weight based on the total weight of the active hydrogen-containing compound and the organic polyisocyanate compound. The results are shown in Tables 3 to 5.

EXAMPLE 14

The same procedure as in Example 12 was repeated except for using 347 parts by weight of the organic polyisocyanate compound C instead of the organic polyisocyanate compound A. As a result, it was confirmed that the content of the backbone structure represented by the formula (1) in the adhesive layer was 53.6% by weight, and the content of the tri-or more functional compounds was 35.6% by weight based on the total weight of the active hydrogen-containing compound and the organic polyisocyanate compound. The results are shown in Tables 3 to 5.

EXAMPLE 15

The same procedure as in Example 12 was repeated except for using 428 parts by weight of the organic polyisocyanate compound D instead of the organic polyisocyanate compound A. As a result, it was confirmed that the content of the backbone structure represented by the formula (1) in the adhesive layer was 45.7% by weight, and the content of the tri-or more functional compounds was 21.9% by weight based on the total weight of the active hydrogen-containing compound and the organic polyisocyanate compound. The results are shown in Tables 3 to 5.

EXAMPLE 16

The same procedure as in Example 12 was repeated except for using 368 parts by weight of the organic polyisocyanate compound E instead of the organic polyisocyanate compound A. As a result, it was confirmed that the content of the backbone structure represented by the formula (1) in the adhesive layer was 50.3% by weight, and the content of the tri-or more functional compounds was 23.6% by weight based on the total weight of the active hydrogen-containing compound and the organic polyisocyanate compound. The results are shown in Tables 3 to 5.

EXAMPLE 17

The same procedure as in Example 12 was repeated except for using 429 parts by weight of the organic polyisocyanate compound F instead of the organic polyisocyanate compound A. As a result, it was confirmed that the content of the backbone structure represented by the formula (1) in the adhesive layer was 45.6% by weight, and the content of the tri- or more functional compounds was 34.2% by weight based on the total weight of the active hydrogen-containing compound and the organic polyisocyanate compound. The results are shown in Tables 3 to 5.

EXAMPLE 18

The same procedure as in Example 12 was repeated except for using 452 parts by weight of the organic polyisocyanate compound H instead of the organic polyisocyanate compound A. As a result, it was confirmed that the content of the backbone structure represented by the formula (1) in the adhesive layer was 23.4% by weight, and the content of the tri-or more functional compounds was 33.1% by weight based on the total weight of the active hydrogen-containing compound and the organic polyisocyanate compound. The results are shown in Tables 3 to 5.

EXAMPLE 19

The same procedure as in Example 12 was repeated except for using 100 parts by weight of the active hydrogen-containing compound B instead of the active hydrogen-containing compound A and using the organic polyisocyanate compound A in an amount of 295 parts by weight. As a result, it was confirmed that the content of the backbone structure represented by the formula (1) in the adhesive layer was 51.6% by weight, and the content of the tri-or more functional compounds was 28.9% by weight based on the total weight of the active hydrogen-containing compound and the organic polyisocyanate compound. The results are shown in Tables 3 to 5.

EXAMPLE 20

The same procedure as in Example 12 was repeated except for using 100 parts by weight of the active hydrogen-containing compound C instead of the active hydrogen-containing compound A and using the organic polyisocyanate compound A in an amount of 322 parts by weight. As a result, it was confirmed that the content of the backbone structure represented by the formula (1) in the adhesive layer was 43.6% by weight, and the content of the tri-or more functional compounds was 27.7% by weight based on the total weight of the active hydrogen-containing compound and the organic polyisocyanate compound. The results are shown in Tables 3 to 5.

EXAMPLE 21

The same procedure as in Example 12 was repeated except for using 100 parts by weight of the active hydrogen-containing compound D instead of the active hydrogen-containing compound A and using 217 parts by weight of the organic polyisocyanate compound F instead of the organic polyisocyanate compound A. As a result, it was confirmed that the content of the backbone structure represented by the formula (1) in the adhesive layer was 60.1% by weight, and the content of the tri-or more functional compounds was 10.2% by weight based on the total weight of the active hydrogen-containing compound and the organic polyisocyanate compound. The results are shown in Tables 3 to 5.

EXAMPLE 22

The same procedure as in Example 12 was repeated except for using 100 parts by weight of the active hydrogen-containing compound E instead of the active hydrogen-containing compound A and using 1,095 parts by weight of the organic polyisocyanate compound F instead of the organic polyisocyanate compound A. As a result, it was confirmed that the content of the backbone structure represented by the formula (1) in the adhesive layer was 42.1% by weight, and the content of the tri-or more functional compounds was 14.2% by weight based on the total weight of the active hydrogen-containing compound and the organic polyisocyanate compound. The results are shown in Tables 3 to 5.

COMPARATIVE EXAMPLE 5

The same procedure as in Example 12 was repeated except for using 418 parts by weight of the organic polyisocyanate compound G instead of the organic polyisocyanate compound A. As a result, it was confirmed that the content of the backbone structure represented by the formula (1) in the adhesive layer was 9.3% by weight, and the content of the tri-or more functional compounds was 34.9% by weight based on the total weight of the active hydrogen-containing compound and the organic polyisocyanate compound. The results are shown in Tables 3 to 5.

COMPARATIVE EXAMPLE 6

The same procedure as in Example 12 was repeated except for using 480 parts by weight of the organic polyisocyanate compound I instead of the organic polyisocyanate compound A. As a result, it was confirmed that the content of the backbone structure represented by the formula (1) in the adhesive layer was 8.3% by weight, and the content of the tri-or more functional compounds was 31.3% by weight based on the total weight of the active hydrogen-containing compound and the organic polyisocyanate compound. The results are shown in Tables 3 to 5.

COMPARATIVE EXAMPLE 7

The same procedure as in Example 12 was repeated except for using 389 parts by weight of the organic polyisocyanate compound J instead of the organic polyisocyanate compound A. As a result, it was confirmed that the content of the backbone structure represented by the formula (1) in the adhesive layer was 9.9% by weight, and the content of the tri-or more functional compounds was 36.9% by weight based on the total weight of the active hydrogen-containing compound and the organic polyisocyanate compound. The results are shown in Tables 3 to 5.

COMPARATIVE EXAMPLE 8

The same procedure as in Example 12 was repeated except for using 100 parts by weight of the active hydrogen-containing compound F instead of the active hydrogen-containing compound A and using 10 parts by weight of the organic polyisocyanate compound K instead of the organic polyisocyanate compound A. As a result, it was confirmed that the content of the backbone structure represented by the formula (1) in the adhesive layer was 0% by weight, and the content of the tri-or more functional compounds was 5.5% by weight based on the total weight of the active hydrogen-containing compound and the organic polyisocyanate compound. The results are shown in Tables 3 to 5.

TABLE 3-1

|  | Appearance | Oxygen permeability ($ml/m^2 \cdot day \cdot MPa$) 60% RH | Oxygen permeability ($ml/m^2 \cdot day \cdot MPa$) 80% RH |
|---|---|---|---|
| Example 12 | Transparent | 100 | 100 |
| Example 13 | Transparent | 140 | 140 |
| Example 14 | Transparent | 130 | 130 |
| Example 15 | Transparent | 160 | 160 |
| Example 16 | Transparent | 120 | 120 |
| Example 17 | Transparent | 200 | 200 |
| Example 18 | Transparent | 250 | 250 |
| Example 19 | Transparent | 150 | 150 |
| Example 20 | Transparent | 160 | 160 |
| Example 21 | Transparent | 100 | 100 |
| Example 22 | Transparent | 150 | 150 |
| Comparative Example 5 | Transparent | 1,260 | 1,260 |
| Comparative Example 6 | Transparent | 2,700 | 2,700 |
| Comparative Example 7 | Transparent | 2,000 | 2,000 |
| Comparative Example 8 | Transparent | 10,000 | >10,000 |

TABLE 3-2

|  | Oxygen permeability ($ml/m^2 \cdot day \cdot MPa$) 90% RH | Oxygen permeability ($ml/m^2 \cdot day \cdot MPa$) 100% RH |
|---|---|---|
| Example 12 | 100 | 150 |
| Example 13 | 140 | 200 |

TABLE 3-2-continued

|  | Oxygen permeability ($ml/m^2 \cdot day \cdot MPa$) 90% RH | Oxygen permeability ($ml/m^2 \cdot day \cdot MPa$) 100% RH |
|---|---|---|
| Example 14 | 130 | 130 |
| Example 15 | 160 | 200 |
| Example 16 | 120 | 160 |
| Example 17 | 200 | 200 |
| Example 18 | 250 | 250 |
| Example 19 | 150 | 200 |
| Example 20 | 160 | 220 |
| Example 21 | 100 | 300 |
| Example 22 | 150 | 250 |
| Comparative Example 5 | 1,260 | 1,260 |
| Comparative Example 6 | 2,700 | 2,700 |
| Comparative Example 7 | 2,000 | 2,000 |
| Comparative Example 8 | >10,000 | >10,000 |

TABLE 4

|  | Water vapor permeability ($g/m^2 \cdot day$) | Oxygen permeability after Gelbo treatment ($ml/m^2 \cdot day \cdot MPa$) | Oxygen permeability after retort treatment ($ml/m^2 \cdot day \cdot MPa$) | Initial adhesion strength (g/15 mm) |
|---|---|---|---|---|
| Example 12 | 4 | 120 | 100 | 40 |
| Example 13 | 4 | 140 | 140 | 60 |
| Example 14 | 4 | 140 | 130 | 100 |
| Example 15 | 4 | 160 | 160 | 70 |
| Example 16 | 4 | 130 | 120 | 60 |
| Example 17 | 4 | 200 | 200 | 80 |
| Example 18 | 4 | 250 | 250 | 120 |
| Example 19 | 4 | 160 | 150 | 50 |
| Example 20 | 4 | 160 | 160 | 60 |
| Example 21 | 4 | 110 | 100 | 90 |
| Example 22 | 4 | 150 | 150 | 110 |
| Comparative Example 5 | 4 | 5,600 | 1,500 | 20 |
| Comparative Example 6 | 4 | 5,800 | 3,300 | 30 |
| Comparative Example 7 | 4 | 2,200 | 2,500 | 10 |
| Comparative Example 8 | 200 | 10,000 | >10,000 | 110 |

TABLE 5

|  | Lamination strength after aging (g/15 mm) | Lamination strength after boiling treatment (g/15 mm) | Lamination strength after retort treatment (g/15 mm) |
|---|---|---|---|
| Example 12 | 850 | 800 | 750 |
| Example 13 | 900 | 800 | 800 |
| Example 14 | 900 | 850 | 800 |
| Example 15 | 850 | 800 | 850 |
| Example 16 | 950 | 900 | 900 |
| Example 17 | 800 | 750 | 800 |
| Example 18 | 850 | 800 | 850 |
| Example 19 | 900 | 800 | 850 |
| Example 20 | 850 | 750 | 800 |
| Example 21 | 850 | 800 | 800 |
| Example 22 | 800 | 700 | 800 |
| Comparative Example 5 | 400 | 200 | 200 |

TABLE 5-continued

|  | Lamination strength after aging (g/15 mm) | Lamination strength after boiling treatment (g/15 mm) | Lamination strength after retort treatment (g/15 mm) |
|---|---|---|---|
| Comparative Example 6 | 300 | 100 | 150 |
| Comparative Example 7 | 200 | 100 | 100 |
| Comparative Example 8 | 800 | 500 | 600 |

C: Examples and Comparative Examples for Gas-Barrier Paints

EXAMPLE 23

One hundred parts by weight of the active hydrogen-containing compound A and 442 parts by weight of the organic polyisocyanate compound L were mixed with each other, and 0.02 part by weight of an acrylic wetting agent "BYK381" available from BYK Chemie GmbH was added thereto. Then, a mixed solution containing acetone and ethyl acetate at a ratio of 1:0.3 was added to the mixture, and the obtained liquid mixture was intimately stirred together to prepare a coating solution.

The thus obtained coating solution was applied onto various base materials, then cured at 60° C. for 1 hour and successively at 120° C. for 30 minutes to prepare a coating film thereon. It was confirmed that the content of the backbone structure represented by the formula (1) in the coating film was 58.3% by weight.

The thus obtained coating film was tested to evaluate various properties thereof. The results for measurements of oxygen permeability, water vapor permeability and adhesion strength of the coating film are shown in Table 6, and the results for measurement of chemical resistance are shown in Table 7.

EXAMPLE 24

The same procedure as in Example 23 was repeated except for using 481 parts by weight of the organic polyisocyanate compound M instead of 442 parts by weight of the organic polyisocyanate compound L. As a result, it was confirmed that the content of the backbone structure represented by the formula (1) in the coating film was 51.0% by weight.

The thus obtained coating film was tested to evaluate various properties thereof. The results are shown in Tables 6 and 7.

EXAMPLE 25

The same procedure as in Example 23 was repeated except for using 387 parts by weight of the organic polyisocyanate compound N instead of 442 parts by weight of the organic polyisocyanate compound L. As a result, it was confirmed that the content of the backbone structure represented by the formula (1) in the coating film was 55.6% by weight.

The thus obtained coating film was tested to evaluate various properties thereof. The results are shown in Tables 6 and 7.

EXAMPLE 26

The same procedure as in Example 23 was repeated except for using 429 parts by weight of the organic polyisocyanate compound O instead of 442 parts by weight of the organic polyisocyanate compound L. As a result, it was confirmed that the content of the backbone structure represented by the formula (1) in the coating film was 46.6% by weight.

The thus obtained coating film was tested to evaluate various properties thereof. The results are shown in Tables 6 and 7.

EXAMPLE 27

The same procedure as in Example 23 was repeated except for using 452 parts by weight of the organic polyisocyanate compound Q instead of 442 parts by weight of the organic polyisocyanate compound L. As a result, it was confirmed that the content of the backbone structure represented by the formula (1) in the coating film was 23.4% by weight.

The thus obtained coating film was tested to evaluate various properties thereof. The results are shown in Tables 6 and 7.

EXAMPLE 28

The same procedure as in Example 23 was repeated except for using 100 parts by weight of the active hydrogen-containing compound B instead of 100 parts by weight of the active hydrogen-containing compound A and using the organic polyisocyanate compound L in an amount of 395 parts by weight. As a result, it was confirmed that the content of the backbone structure represented by the formula (1) in the coating film was 53.6% by weight.

The thus obtained coating film was tested to evaluate various properties thereof. The results are shown in Tables 6 and 7.

EXAMPLE 29

The same procedure as in Example 23 was repeated except for using 100 parts by weight of the active hydrogen-containing compound G instead of 100 parts by weight of the active hydrogen-containing compound A and using 317 parts by weight of the organic polyisocyanate compound N instead of 442 parts by weight of the organic polyisocyanate compound L. As a result, it was confirmed that the content of the backbone structure represented by the formula (1) in the coating film was 62.1% by weight.

The thus obtained coating film was tested to evaluate various properties thereof. The results are shown in Tables 6 and 7.

EXAMPLE 30

The same procedure as in Example 23 was repeated except for using 100 parts by weight of the active hydrogen-containing compound H instead of 100 parts by weight of the active hydrogen-containing compound A and using 267 parts by weight of the organic polyisocyanate compound O instead of 442 parts by weight of the organic polyisocyanate compound L. As a result, it was confirmed that the content of the backbone structure represented by the formula (1) in the coating film was 44.1% by weight.

The thus obtained coating film was tested to evaluate various properties thereof. The results are shown in Tables 6 and 7.

COMPARATIVE EXAMPLE 9

The same procedure as in Example 23 was repeated except for using 418 parts by weight of the organic polyisocyanate compound P instead of 442 parts by weight of the organic polyisocyanate compound L. As a result, it was confirmed that the content of the backbone structure represented by the formula (1) in the coating film was 9.3% by weight.

The thus obtained coating film was tested to evaluate various properties thereof. The results are shown in Tables 6 and 7.

COMPARATIVE EXAMPLE 10

The same procedure as in Example 23 was repeated except for using 480 parts by weight of the organic polyisocyanate compound R instead of 442 parts by weight of the organic polyisocyanate compound L. As a result, it was confirmed that the content of the backbone structure represented by the formula (1) in the coating film was 8.3% by weight.

The thus obtained coating film was tested to evaluate various properties thereof. The results are shown in Tables 6 and 7.

COMPARATIVE EXAMPLE 11

The same procedure as in Example 23 was repeated except for using 389 parts by weight of the organic polyisocyanate compound S instead of the organic polyisocyanate compound L. As a result, it was confirmed that the content of the backbone structure represented by the formula (1) in the coating film was 9.9% by weight.

The thus obtained coating film was tested to evaluate various properties thereof. The results are shown in Tables 6 and 7.

COMPARATIVE EXAMPLE 12

The same procedure as in Example 23 was repeated except for using 100 parts by weight of the active hydrogen-containing compound I instead of 100 parts by weight of the active hydrogen-containing compound A and using 20 parts by weight of the organic polyisocyanate compound T instead of the organic polyisocyanate compound L. As a result, it was confirmed that the content of the backbone structure represented by the formula (1) in the coating film was 0% by weight.

The thus obtained coating film was tested to evaluate various properties thereof The results are shown in Tables 6 and 7.

TABLE 6

| | Oxygen permeability (ml · mm/m² · day · MPa) | Water vapor permeability (g · mm/m² · day) | Adhesion strength of coating film/100 |
|---|---|---|---|
| Example 23 | 0.28 | 0.6 | 100 |
| Example 24 | 0.40 | 0.6 | 100 |
| Example 25 | 0.34 | 0.4 | 100 |
| Example 26 | 0.60 | 0.4 | 100 |
| Example 27 | 0.30 | 0.6 | 100 |
| Example 28 | 0.40 | 0.5 | 100 |
| Example 29 | 0.55 | 0.6 | 100 |
| Example 30 | 0.80 | 0.5 | 100 |
| Comparative Example 9 | 2.6 | 1.5 | 80 |
| Comparative Example 10 | 6.0 | 1.8 | 30 |

TABLE 6-continued

| | Oxygen permeability (ml · mm/m² · day · MPa) | Water vapor permeability (g · mm/m² · day) | Adhesion strength of coating film/100 |
|---|---|---|---|
| Comparative Example 11 | 8.5 | 3.0 | 50 |
| Comparative Example 12 | 400 | 1.0 | 100 |

TABLE 7-1

| | Distilled water | Spray with brine | Sulfuric acid |
|---|---|---|---|
| Example 23 | Ex | Ex | Ex |
| Example 24 | Ex | Ex | Ex |
| Example 25 | Ex | Ex | Ex |
| Example 26 | Ex | Ex | Ex |
| Example 27 | Ex | Ex | Ex |
| Example 28 | Ex | Ex | Ex |
| Example 29 | Ex | Ex | Ex |
| Example 30 | Ex | Ex | Ex |
| Comparative Example 9 | Ex | P | Ex |
| Comparative Example 10 | Ex | P | F |
| Comparative Example 11 | Ex | P | F |
| Comparative Example 12 | Ex | Ex | Ex |

TABLE 7-2

| | Acetic acid | Sodium hydroxide | Toluene |
|---|---|---|---|
| Example 23 | Ex | G | Ex |
| Example 24 | Ex | Ex | Ex |
| Example 25 | Ex | G | Ex |
| Example 26 | Ex | Ex | Ex |
| Example 27 | Ex | G | Ex |
| Example 28 | Ex | G | Ex |
| Example 29 | Ex | G | Ex |
| Example 30 | Ex | G | Ex |
| Comparative Example 9 | P | F | F |
| Comparative Example 10 | F | P | Ex |
| Comparative Example 11 | Ex | F | Ex |
| Comparative Example 12 | Ex | G | Ex |

What is claimed is:
1. A polyurethane resin produced by reacting a component comprising mainly (A) an alkyleneoxide adduct of xylylenediamine and a component comprising mainly (B) an organic polyisocyanate compound, said polyurethane resin containing a backbone structure represented by the formula (1):

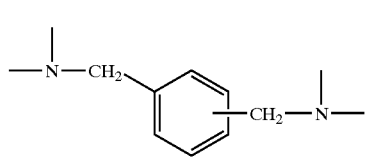

(1)

in an amount of 25% by weight or higher,
wherein said organic polyisocyanate compound (B) is a reaction product obtained by reacting (a) xylylenediisocyanate and (b) at least one polyfunctional alcohol selected from the group consisting of $C_2$ to $C_{10}$ polyfunctional alcohols, or a reaction product obtained by reacting (a) xylylenediisocyanate, (b) the at least one polyfunctional alcohol and (c) at least one compound selected from the group consisting of aromatic polyfunctional amines, aroaliphatic polyfunctional amines, alicyclic polyfunctional amines, aliphatic polyfunctional amines, aliphatic alkanol amines, aromatic polyfunctional carboxylic acids, alicyclic polyfunctional carboxylic acids and aliphatic polyfunctional carboxylic acids, and has two or more NCO end groups.

2. A two-part liquid curable polyurethane resin composition comprising:

a component comprising mainly (A) an alkyleneoxide adduct of xylylenediamine; and a component comprising mainly (B) an organic polyisocyanate compound, said components (A) and (B) being reacted with each other to form a cured product containing a backbone structure represented by the formula (1):

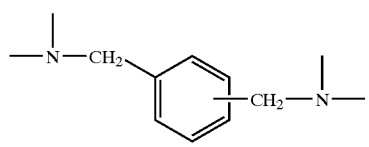

(1)

in an amount of 25% by weight or higher, wherein said organic polyisocyanate compound (B) is a reaction product obtained by reacting (a) xylylenediisocyanate and (b) at least one polyfunctional alcohol selected from the group consisting of $C_2$ to $C_{10}$ polyfunctional alcohols, or a reaction product obtained by reacting (a) xylylenediisocyanate, (b) the at least one polyfunctional alcohol and (c) at least one compound selected from the group consisting of aromatic polyfunctional amines, aroaliphatic polyfunctional amines, alicyclic polyfunctional amines, aliphatic polyfunctional amines, aliphatic alkanol amines, aromatic polyfunctional carboxylic acids, alicyclic polyfunctional carboxylic acids and aliphatic polyfunctional carboxylic acids, and has two or more NCO end groups.

3. The two-part liquid curable polyurethane resin composition according to claim 2, wherein said alkyleneoxide adduct is at least one compound selected from the group consisting of $C_2$ to $C_4$ alkyleneoxide adducts.

4. An adhesive for gas-barrier laminate comprising the two-part liquid curable polyurethane resin composition as claimed in claim 2.

5. The adhesive according to claim 4, having an initial adhesion strength of 30 g/15 mm or higher as measured by subjecting polymer films laminated through said adhesive to T-peel test immediately after the lamination at a peel velocity of 300 mm/min.

6. An adhesive assistant comprising the adhesive for gas-barrier laminate as claimed in claim 4.

7. A heat-curing gas-barrier polyurethane resin comprising:

a cured resin produced by reacting (A) an alkyleneoxide adduct of xylylenediamine with (B) at least one compound selected from the group consisting of xylylenediisocyanate and derivatives thereof, said cured resin containing a backbone structure represented by the formula (1):

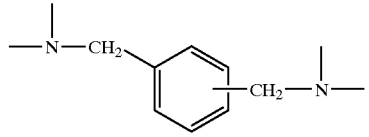

(1)

in an amount of 25% by weight or higher, and the components (A) and (B) containing tri- or more functional compounds in an amount of 7% by weight or higher based on a total weight of the components (A) and (B).

8. The heat-curing gas-barrier polyurethane resin according to claim 7, wherein said resin has an oxygen permeability of 500 ml/m²-day-MPa or higher as measured at 23° C. and 60% RH with a resin thickness of 10 μm.

9. The heat-curing gas-barrier polyurethane resin according to claim 7, wherein a ratio ($R_{60}/R_{100}$) of an oxygen permeability ($R_{60}$) as measured at 23° C. and 60% RH with a resin thickness of 10 μm to an oxygen permeability ($R_{100}$) as measured at 23° C. and 100% RH with a resin thickness of 10 μm is 1/1 to 1/3.

10. The heat-curing gas-barrier polyurethane resin according to claim 7, wherein said tri- or more functional compound is at least one compound selected from the group consisting of buret compounds, allophanate compounds and isocyanurate compounds of aromatic, aroaliphatic, alicyclic and aliphatic diisocyanates, $C_3$ to $C_6$ polyols, alkyleneoxide adducts of polyamine, and amido-containing polyols.

11. The heat-curing gas-barrier polyurethane resin according to claim 10, wherein said tri- or more functional compound is at least one compound selected from the group consisting of isocyanurate compounds of aroaliphatic and alicyclic diisocyanates, $C_3$ to $C_6$ polyols and alkyleneoxide adducts of aroaliphatic polyamine.

12. The heat-curing gas-barrier polyurethane resin according to claim 10, wherein said tri- or more functional compound is at least one compound selected from the group consisting of isocyanurate compounds of xylylenediisocyanate and bis(isocyanatomethyl)cyclohexane, glycerol, trimethylol ethane, timethylol propane, pentaerythritol, and alkyleneoxide adducts of xylylenediamine.

13. A gas-barrier film prepared by forming the heat-curing gas-barrier polyurethane resin as claimed in claim 7 into a film shape.

14. A gas-barrier composite film comprising a base film layer, and a layer containing the heat-curing gas-barrier polyurethane resin as claimed in claim 7.

15. A gas-barrier paint comprising as a film-forming component, a gas-barrier paint composition containing (A) an alkyleneoxide adduct of xylylenediamine and (B) an organic polyisocyanate compound as main components, said composition being cured into a coating film containing a backbone structure represented by the formula (1):

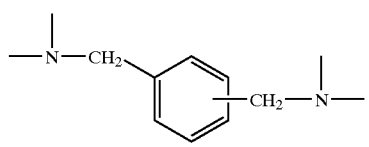

(1)

in an amount of 25% by weight or higher, wherein said organic polyisocyanate compound (B) is a reaction product of (a) xylylenediamine and (b) at least one polyfunctional alcohol selected from the group consisting of $C_2$ to $C_{10}$ polyfunctional alcohols, or a reaction product of the compounds (a) and (b) with (c) at least one compound selected from the group consisting of aromatic polyfunctional amines, aroaliphatic polyfunctional amines, alicyclic polyfunctional amines, aliphatic polyfunctional amines, aliphatic alkanol amines, aromatic polyfunctional carboxylic acids, alicyclic polyfunctional carboxylic acids and aliphatic polyfunctional carboxylic acids, and has two or more NCO end groups.

16. The gas-barrier paint according to claim 15, wherein said paint is a primer.

17. A gas-barrier coating film formed by curing a gas-barrier paint composition containing (A) an alkyleneoxide adduct of xylylenediamine and (B) an organic polyisocyanate compound as main components, said coating film containing a backbone structure represented by the formula (1):

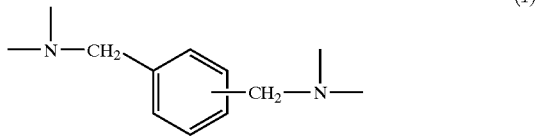

(1)

in an amount of 25% by weight or higher, wherein said organic polyisocyanate compound (B) is a reaction product of (a) xylylenediamine and (b) at least one polyfunctional alcohol selected from the group consisting of $C_2$ to $C_{10}$ polyfunctional alcohols, or a reaction product of the compounds (a) and (b) with (c) at least one compound selected from the group consisting of aromatic polyfunctional amines, aroaliphatic polyfunctional amines, alicyclic polyfunctional amines, aliphatic polyfunctional amines, aliphatic alkanol amines, aromatic polyfunctional carboxylic acids, alicyclic polyfunctional carboxylic acids and aliphatic polyfunctional carboxylic acids, and has two or more NCO end groups.

18. The polyurethane resin according to claim 1, containing the backbone structure represented by the formula (1) in an amount of 30% by weight or higher.

19. The two-part liquid curable polyurethane resin composition according to claim 2, wherein said cured product contains the backbone structure represented by the formula (1) in an amount of 30% by weight or higher.

20. The heat-curing gas-barrier polyurethane resin according to claim 7, wherein said cured resin contains the backbone structure represented by the formula (1) in an amount of 30% by weight or higher.

21. The gas-barrier paint according to claim 15, wherein said coating film contains the backbone structure represented by the formula (1) in an amount of 30% by weight or higher.

22. The gas-barrier coating film according to claim 17, wherein said coating film contains the backbone structure represented by the formula (1) in an amount of 30% by weight or higher.

* * * * *